(12) United States Patent
Badac et al.

(10) Patent No.: US 11,827,854 B2
(45) Date of Patent: Nov. 28, 2023

(54) METHODS AND SYSTEMS FOR LIQUEFACTION OF CARBONACEOUS MATERIALS

(71) Applicant: Qwave Solutions, Inc., Hyde Park, PA (US)

(72) Inventors: Jeffrey Badac, Hyde Park, PA (US); Ryan Booth, Hyde Park, PA (US); Kaitlin Harris, Hyde Park, PA (US); Cliff Raleigh, Hyde Park, PA (US); Steven Schlaegle, Hyde Park, PA (US); Richard Troiano, Hyde Park, PA (US); Wesley Conroy, Hyde Park, PA (US)

(73) Assignee: Qwave Solutions, Inc., Hyde Park, PA (US)

( * ) Notice: Subject to any disclaimer, the term of this patent is extended or adjusted under 35 U.S.C. 154(b) by 0 days.

(21) Appl. No.: 17/876,990

(22) Filed: Jul. 29, 2022

(65) Prior Publication Data

US 2023/0043278 A1 Feb. 9, 2023

Related U.S. Application Data

(60) Provisional application No. 63/227,406, filed on Jul. 30, 2021.

(51) Int. Cl.
*C10G 1/06* (2006.01)

(52) U.S. Cl.
CPC .......... *C10G 1/06* (2013.01); *C10G 2300/42* (2013.01)

(58) Field of Classification Search
CPC . C10G 1/06; C10G 1/065; C10G 1/00; C10G 2300/42
See application file for complete search history.

(56) References Cited

U.S. PATENT DOCUMENTS

| | | | | |
|---|---|---|---|---|
| 3,503,865 A * | 3/1970 | Stone | ............ | C10G 1/00 204/157.43 |
| 3,594,303 A * | 7/1971 | Kirk | ............ | C10G 1/065 208/415 |
| 3,973,733 A * | 8/1976 | Switzer | ............ | B02C 19/0012 241/1 |
| 4,039,426 A * | 8/1977 | Schutte | ............ | C10G 1/006 208/50 |
| 4,108,759 A * | 8/1978 | Young | ............ | C10G 1/00 204/157.43 |

(Continued)

FOREIGN PATENT DOCUMENTS

| | | |
|---|---|---|
| CN | 104830363 A | 8/2015 |
| WO | 2020146337 A1 | 7/2020 |

OTHER PUBLICATIONS

Bhattacharya, A review on susceptor assisted microwave processing of materials, Elsevier, Energy, vol. 97, pp. 306-338. (Year: 2016).*

(Continued)

*Primary Examiner* — Michelle Stein
(74) *Attorney, Agent, or Firm* — Eversheds Sutherland (US) LLP

(57) ABSTRACT

Methods for liquefaction of carbonaceous materials, including methods that use electromagnetic radiation. Systems for liquefaction of carbonaceous materials. The systems may include a circulation conduit for mixing reactants, and/or a heating apparatus that relies on electromagnetic radiation.

14 Claims, 7 Drawing Sheets

(56) References Cited

U.S. PATENT DOCUMENTS

| | | | | |
|---|---|---|---|---|
| 4,313,737 | A * | 2/1982 | Massey | B03B 9/005 241/20 |
| 4,326,945 | A * | 4/1982 | Flagg | C10G 1/00 208/402 |
| 4,419,214 | A * | 12/1983 | Balint | C10G 1/00 208/402 |
| 4,772,379 | A * | 9/1988 | Gomberg | C10G 1/04 208/402 |
| 4,842,830 | A | 6/1989 | Low | |
| 11,438,976 | B2 * | 9/2022 | Badac | H05B 6/784 |
| 2002/0108949 | A1 * | 8/2002 | Gedevanishvili | H05B 6/6494 219/759 |
| 2011/0314730 | A1 * | 12/2011 | Gomez | C10L 9/08 44/620 |
| 2012/0082593 | A1 * | 4/2012 | Stiller | C10G 1/065 422/187 |
| 2013/0213795 | A1 * | 8/2013 | Strohm | C10G 32/02 422/186.29 |
| 2013/0320001 | A1 | 12/2013 | Kondo | |
| 2015/0057479 | A1 | 2/2015 | Johnson et al. | |
| 2020/0332197 | A1 * | 10/2020 | Ackerman | C10G 1/042 |
| 2022/0111397 | A1 * | 4/2022 | Troiano | B02C 23/22 |
| 2023/0007742 | A1 * | 1/2023 | Badac | H05B 6/802 |

OTHER PUBLICATIONS

Partial International Search Report and Provisional Opinion issued in international application No. PCT/US2022/038812, dated Nov. 9, 2022, 23 pages.

Gibbons, Jon et al., A flowing solvent reactor for coal liquefaction with direct electrical resistance heating, Review of Scientific Instruments, vol. 62, Sep. 1, 1991, pp. 2234-2242.

Yagmur, Emine et al., Part 1. The Effect of Microwave Receptors on the Liquefaction of Turkish Coals by Microwave Energy in a Hydrogen Donor Solvent, Energy & Fuels, vol. 19, No. 6, Oct. 13, 2005, pp. 2480-2487.

* cited by examiner

METHODS AND SYSTEMS FOR LIQUEFACTION OF CARBONACEOUS MATERIALS

CROSS-REFERENCE TO RELATED APPLICATIONS

This application claims priority to U.S. Provisional Patent Application No. 63/227,406, filed Jul. 30, 2021, which is incorporated herein by reference.

FIELD OF THE INVENTION

This application relates to liquefaction of carbonaceous materials, including methods and systems for liquefaction.

BACKGROUND

Liquefaction is a process that may be used to convert carbonaceous materials, such as coal, to one or more liquids, which may be used as fuels or petrochemicals.

Coal liquefaction has been performed in several ways. Some methods use steam and oxygen to gasify coal to produce synthesis gas, which is then reacted with a catalyst in a Fischer-Tropsch process to convert the synthesis gas into one or more liquids, which may include a range of useful hydrocarbons. Some methods contact pulverized coal with hydrogen and a catalyst in the presence of a solvent at high pressure and temperature in order to convert the pulverized coal into one or more liquids, which may be used as fuels.

These methods, however, typically are energy intensive, inefficient, environmentally harmful, or a combination thereof.

BRIEF SUMMARY

Provided herein are methods and systems for liquefaction that overcome one or more of the foregoing disadvantages, including methods and systems that rely on heat generated by electromagnetic radiation.

In one aspect, methods of liquefaction are provided. In some embodiments, the methods include providing a hydrogen donor; and contacting a solid carbonaceous material and the hydrogen donor to convert at least a portion of the solid carbonaceous material to a product. The hydrogen donor may have a temperature of at least 300° C. The contacting of the solid carbonaceous material and the hydrogen donor may occur at a pressure greater than ambient pressure, such as a pressure that is equal to or greater than the critical pressure of the hydrogen donor.

In another aspect, systems are provided, including systems that may be used for liquefaction. In some embodiments, the systems include a reactor; a hydrogen donor feeder; and a product liquid collection reservoir. The hydrogen donor feeder and the product liquid collection reservoir may be in fluid communication with the reactor. The reactor may be configured to receive a carbonaceous material from a carbonaceous material feeder. The hydrogen donor feeder may be configured to provide to the reactor a hydrogen donor, such as a hydrogen donor having a temperature of at least 300° C. The systems also may include a circulation conduit configured to remove from the reactor and then return to the reactor at least a portion of the reactor's contents. The systems also may include a condenser; and a product condensate collection reservoir. The condenser may be in fluid communication with the reactor, and the product condensate collection reservoir may be in fluid communication with the condenser. The systems also may include a reactor heater. The systems also may include one or more process gas feeders, such as a first process gas feeder that may be in fluid communication with the reactor, the carbonaceous material feeder, the product liquid collection reservoir, or a combination thereof; and a second process gas feeder, which may be in fluid communication with the product liquid collection reservoir.

In a further aspect, methods of liquefaction using the systems described herein are provided. In some embodiments, the methods include providing any of the systems described herein; optionally heating the reactor with the reactor heater to a pre-heat reactor temperature of at least 300° C.; disposing a process gas, such as an inert gas, in the reactor from the first process gas feeder to pressurize the reactor; disposing the hydrogen donor in the reactor; disposing a carbonaceous material from the carbonaceous material feeder into the reactor to contact the carbonaceous material and the hydrogen donor in the reactor to produce a product; collecting a product condensate in the product condensate collection reservoir; and collecting a product liquid in the product liquid collection reservoir. The reactor may be pressurized to any pressure greater than atmospheric pressure. For example, the reactor may be pressurized to a pressure equal to or greater than the critical pressure of a hydrogen donor in the hydrogen donor feeder, and the methods may include maintaining in the reactor the pressure greater than atmospheric pressure, such as the pressure equal to or greater than the critical pressure of the hydrogen donor, prior to the collecting of the product condensate and the product liquid.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Provided herein are methods and systems for liquefaction.

Systems

The systems provided herein are described with regard to the various components of the systems and the relationship (e.g., fluid communication) among the components. Multiple embodiments of the systems are described herein, and any component of any embodiment of a system may be used in a different embodiment of the system.

As used herein, two components are in "fluid communication" with each other when they are directly connected or indirectly connected, via piping and/or other known equipment, in a manner that permits a fluid to flow between the two components, e.g., to and/or from one component to the other. A valve or other apparatus, if present, may be used to control the flow of a fluid between two components that are in "fluid communication" with each other, and the presence of the valve or other apparatus does not prevent the two components from being in "fluid communication" with each other, as defined herein.

In some embodiments, the systems include a reactor, a hydrogen donor feeder, and a product liquid collection reservoir. The hydrogen donor feeder and the product liquid collection reservoir may be in fluid communication with the reactor. The reactor may be configured to receive a carbonaceous material from a carbonaceous material feeder.

Figure 1:
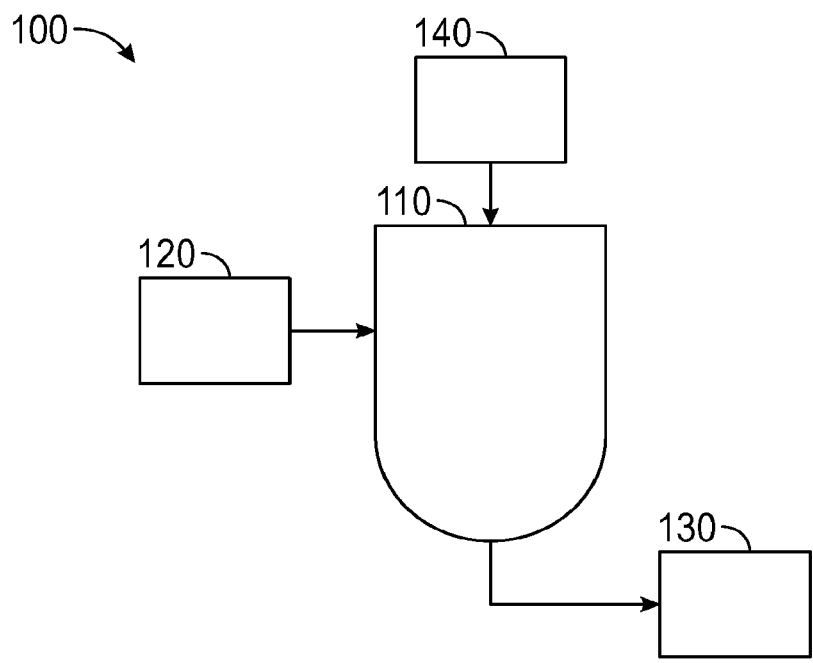
FIG. 1 is a schematic of an embodiment of a system described herein.
Figure 2A:
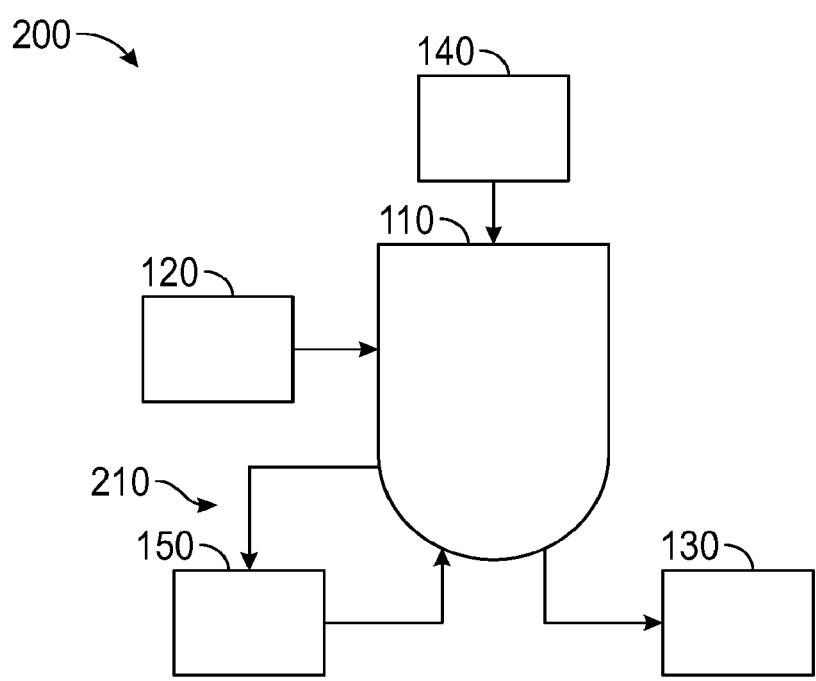
FIG. 2A is a schematic of an embodiment of a system described herein, which includes an embodiment of a circulation conduit.
Figure 2B:
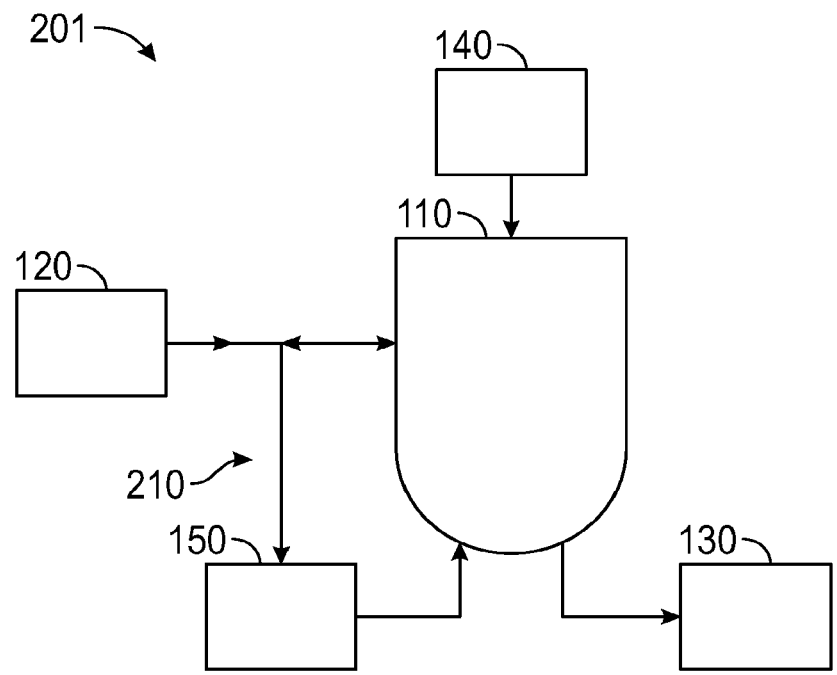
FIG. 2B is a schematic of an embodiment of a system described herein, which includes an embodiment of a circulation conduit.
Figure 2C:
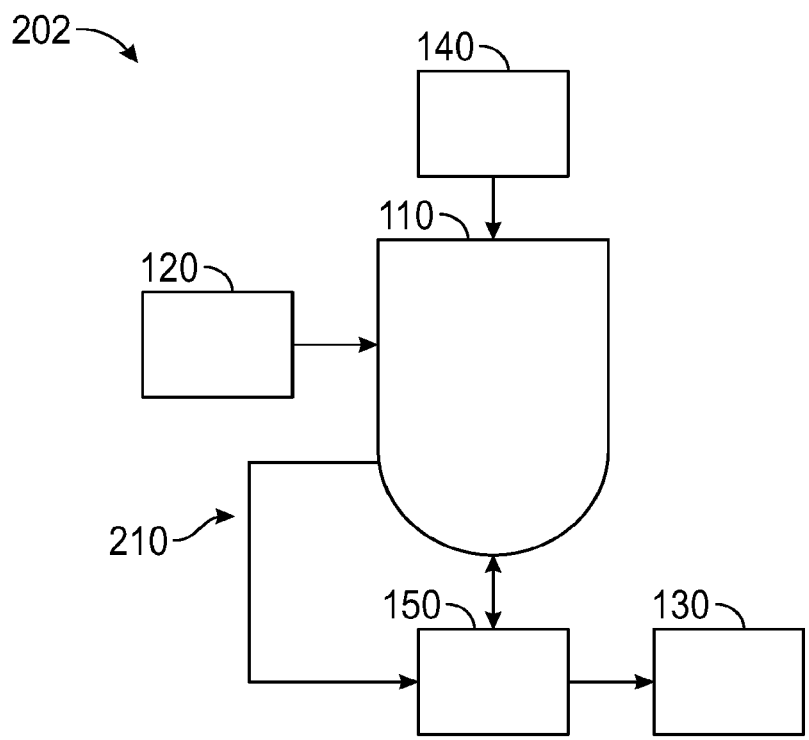
FIG. 2C is a schematic of an embodiment of a system described herein, which includes an embodiment of a circulation conduit.
Figure 2D:
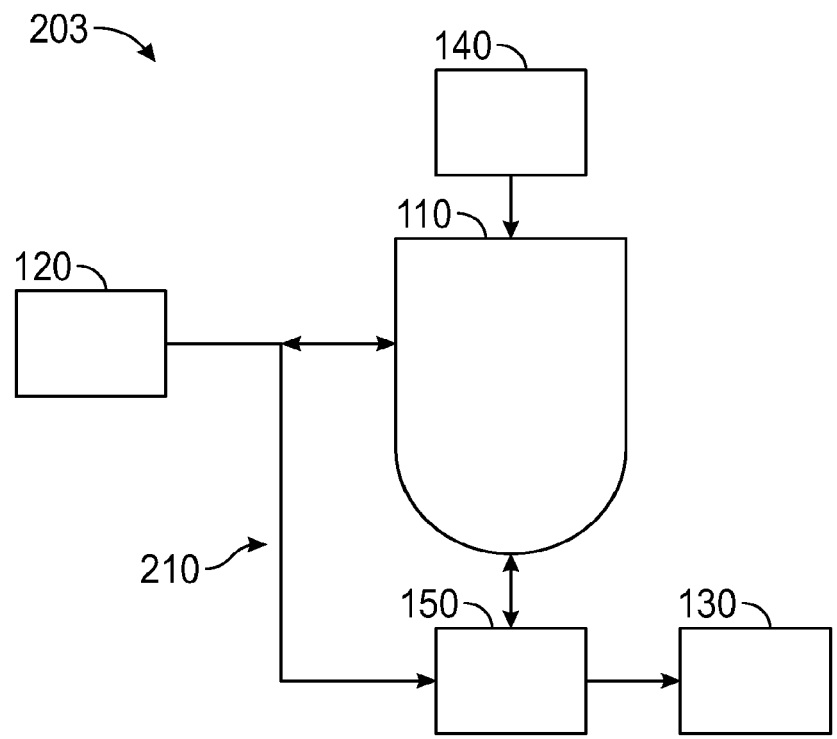
FIG. 2D is a schematic of an embodiment of a system described herein, which includes an embodiment of a circulation conduit.

In some embodiments, the systems provided herein include the components depicted at FIG. 1. The system 100 of FIG. 1 includes a reactor 110, a hydrogen donor feeder 120, a product liquid collection reservoir 130, and a carbonaceous material feeder 140. The hydrogen donor feeder 120 and the product liquid collection reservoir 130 of the system 100 of FIG. 1 are in fluid communication with the reactor 110. The reactor 110 of FIG. 1 is configured to receive a carbonaceous material from the carbonaceous material feeder 140. The carbonaceous material feeder 140 of FIG. 1 may be in fluid communication with the reactor 110, and is positioned in FIG. 1 at a location effective to permit gravity to transfer the carbonaceous material from the carbonaceous material feeder 140 to the reactor 110, but other configurations are envisioned, including those in which one or more forces other than or in addition to gravity are used to provide the carbonaceous material from the carbonaceous material feeder 140 to the reactor 110. For example, a solid carbonaceous material may be a component of a slurry, and the carbonaceous material feeder 140 may include a slurry pump in fluid communication with the reactor 110. The hydrogen donor feeder 120 may be configured, as described herein, to provide to the reactor 110 a hydrogen donor, such as a hydrogen donor having a temperature of at least 300° C.

Reactor

The reactors of the systems described herein may include any reactor configured to host the contacting of a solid carbonaceous material and a hydrogen donor. A reactor is "configured to host the contacting of a solid carbonaceous material and a hydrogen donor" when the reactor has an internal volume sufficient to accommodate desired amounts of the solid carbonaceous material and the hydrogen donor.

A reactor may be formed of any material, such as metal, and have any shape that is capable of withstanding the forces, such as pressure, that the reactor may be subjected to during the processes described herein.

A reactor may include a mixing apparatus configured for mixing the reactor's contents. The mixing apparatus may include any known agitator, including, but not limited to a paddle mixer, an auger mixer, a gas mixer, etc.

A reactor may include one or more openings to accommodate the other components of the systems described herein. Each of the one or more openings may accommodate only egress, only ingress, or both egress and ingress (e.g., opening 113 of FIG. 9) from and to the reactor, respectively. For example, a reactor may include one or more openings to accommodate a circulation conduit, as described herein.

Circulation Conduit

In some embodiments, the systems described herein include a circulation conduit configured to remove from the reactor and then return to the reactor at least a portion of the reactor's contents (e.g., a hydrogen donor and a carbonaceous material). The circulation conduit may be used continuously, intermittently, or a combination thereof throughout or during any portion of the methods described herein.

Not wishing to be bound by any particular theory, it is believed that the circulation conduit may aid in mixing the reactor's contents, aid in the removal of the reactor's contents (e.g., a reactant and/or product) from the reactor, facilitate adequate chemical reaction (e.g., influence rate and/or yield of chemical reaction) among the reactor's contents despite changes in densities observed at increased temperature, or a combination thereof.

A circulation conduit may include a pump in fluid communication with (i) a reactor, (ii) a reactor and a hydrogen donor feeder, (iii) a reactor and a product liquid collection reservoir, or (iv) a reactor, a hydrogen donor feeder, and a product liquid collection reservoir. A pump may be configured to (a) remove from the reactor, (b) remove from the reactor and return to the reactor, or (c) return to the reactor at least a portion of the reactor's contents. In other words, a force applied by a pump may be used to remove, remove and return, or return a reactor's contents to/from the reactor.

A pump, for example, may be used to remove at least a portion of the reactor's contents via an opening. The at least a portion of the reactor's contents then may be returned to the reactor via an opening, which may be the same opening through which the reactor's contents were removed from the reactor or a different opening.

In some embodiments, the system 100 of FIG. 1 includes a pump, as depicted, for example, at FIG. 2A, FIG. 2B, FIG. 2C, and FIG. 2D. The pump 150 of the systems 200, 201, 202, 203 of FIG. 2A, FIG. 2B, FIG. 2C, and FIG. 2D, respectively, may be configured to (a) remove from the reactor 110, (b) remove from the reactor 110 and return to the reactor 110, or (c) return to the reactor 110 at least a portion of the reactor's contents. A pump 150 may be in fluid communication with one or more different components of a system. In the embodiment of the system 200 of FIG. 2A, the pump 150 is in fluid communication with the reactor 110. In the embodiment of the system 201 of FIG. 2B, the pump 150 is in fluid communication with the hydrogen donor feeder 120 and the reactor 110. In the embodiment of the system 202 depicted at FIG. 2C, the pump 150 is in fluid communication with the product liquid collection reservoir 130 and the reactor 110. In the embodiment of the system 203 depicted at FIG. 2D, the pump 150 is in fluid communication with the hydrogen donor feeder 120, the product liquid collection reservoir 130, and the reactor 110. The pump 150 of each of FIG. 2A, FIG. 2B, FIG. 2C, and FIG. 2D is part of an embodiment of a circulation conduit 210.

A circulation conduit generally may include any type of pump. In some embodiments, the pump is a positive displacement pump. The pump, such as a positive displacement pump, may have a cavity volume sufficient to displace, per each cycle, about 2% to about 15%, about 2% to about 12%, about 2% to about 10%, about 2% to about 8%, or about 4% to about 8%, or about 6%, by weight, of the reactor's contents. For example, if the reactor's contents (which may include a solid carbonaceous material, hydrogen donor, and one or more products) has a total weight of 100 kg, then a pump may have a cavity volume sufficient to displace, per each cycle, about 2 kg to about 15 kg of the reactor's contents.

Condenser and Product Condensate Collection Reservoir

The systems provided herein may include a condenser, or a condenser and a product condensate collection reservoir. The condenser may be in fluid communication with the reactor, and the product condensate collection reservoir may be in fluid communication with the condenser.

Figure 3:
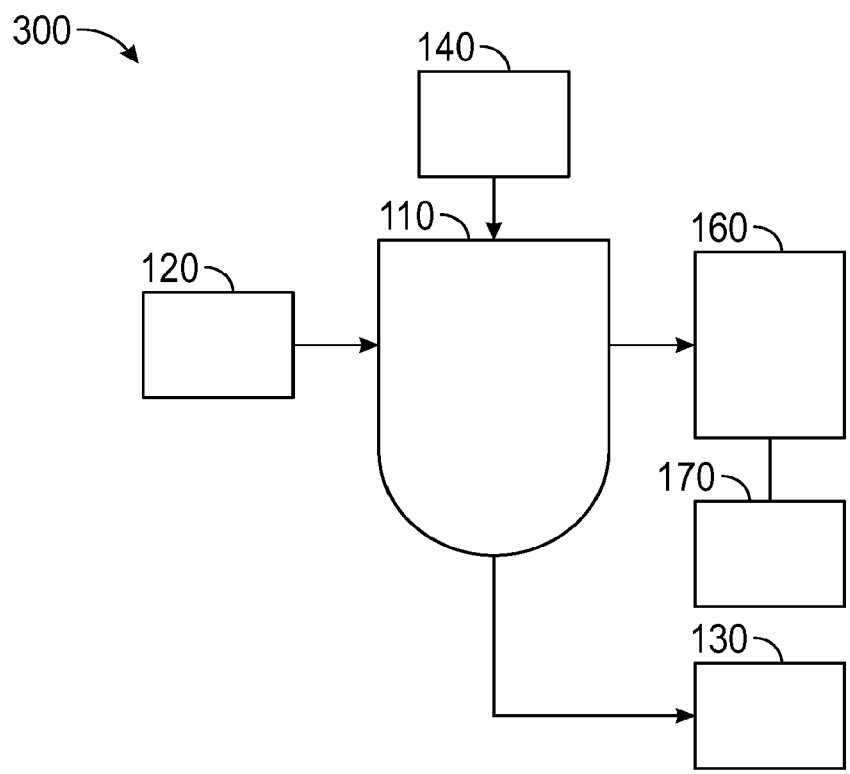
FIG. 3 is a schematic of an embodiment of a system described herein, which includes a condenser and a condensate product collection reservoir.

In some embodiments, the systems 100, 200, 201, 202, 203 of FIG. 1, FIG. 2A, FIG. 2B, FIG. 2C, and FIG. 2D, respectively, also include a condenser 160 and a product condensate collection reservoir 170, as depicted, for example, at FIG. 3. FIG. 3 depicts a system 300 including the components of FIG. 1 and a condenser 160 in fluid communication with the reactor 110, and a product condensate collection reservoir 170 in fluid communication with the condenser 160. Although the system 300 of FIG. 3 includes the components of the system 100 of FIG. 1, the condenser 160 and the product condensate collection reservoir 170 may be included in any of the systems 200, 201, 202, 203 depicted at FIG. 2A, FIG. 2B, FIG. 2C, and FIG. 2D, respectively.

Reactor Heater

In some embodiments, the systems provided herein include a reactor heater. The reactor heater may be configured to increase and/or maintain a temperature of at least a portion of a reactor and/or the reactor's contents. A reactor heater may be placed adjacent or in contact with a reactor. For example, a reactor heater may contact at least a portion of a reactor. In some embodiments, a reactor heater is a fluid bath in which a reactor may be at least partially submerged.

Figure 4:
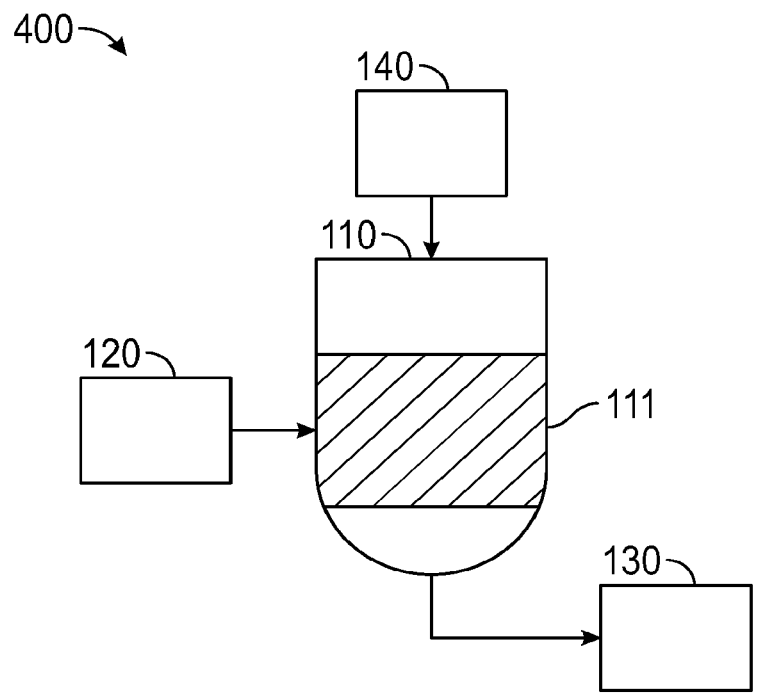
FIG. 4 is a schematic of an embodiment of a system described herein, which includes a reactor heater.

In some embodiments, the systems 100, 200, 201, 202, 203, 300 of FIG. 1, FIG. 2A, FIG. 2B, FIG. 2C, FIG. 2D, and FIG. 3, respectively, also include a reactor heater 111, as depicted, for example, at FIG. 4. FIG. 4 depicts a system 400 including the components of FIG. 1 and a reactor heater 111 at least partially contacting the reactor 110. Although the system 400 of FIG. 4 includes the components of the system 100 of FIG. 1, the reactor heater 111 may be included in any of the systems 200, 201, 202, 203, 300 depicted at FIG. 2A, FIG. 2B, FIG. 2C, FIG. 2D, and FIG. 3, respectively.

In addition to a reactor, a reactor heater may be configured to heat one or more other components of the systems described herein. In some embodiments, the systems include one or more additional heaters configured to heat one or more of the other components of the systems described herein. The efficacies of the reactor heater and/or one or more additional heaters may be improved with any known equipment or material, such as an insulating material.

Process Gas Feeder

The systems provided herein may include one or more process gas feeders. The process gas feeders may be any apparatus capable of providing a process gas to one or more components of a system described herein, and, optionally, applying and/or maintaining a pressure provided at least in part by the process gas. The process gas may include an inert gas (such as $N_2$), a reactive gas (such as $H_2$), or a combination thereof.

In some embodiments, the systems provided herein include a process gas feeder that may be in fluid communication with a reactor, a carbonaceous material feeder, a product liquid collection reservoir, or a combination thereof. In some embodiments, a process gas feeder is in fluid communication with a reactor and a carbonaceous material feeder.

Although portions of this disclosure refer to process gas feeders as a "first process gas feeder" and a "second process gas feeder", the terms "first" and "second" are used only for convenience, and do not indicate that a "first" feeder must be present in a system if the systems includes a feeder characterized herein as a "second" feeder.

Figure 5A:
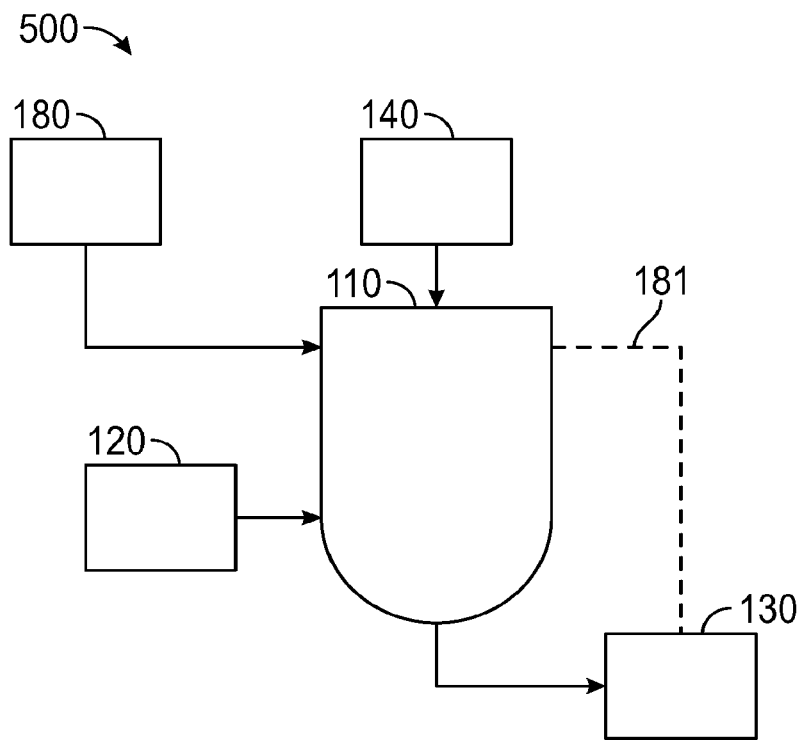
FIG. 5A is a schematic of an embodiment of a system described herein, which includes a first process gas feeder.
Figure 5B:
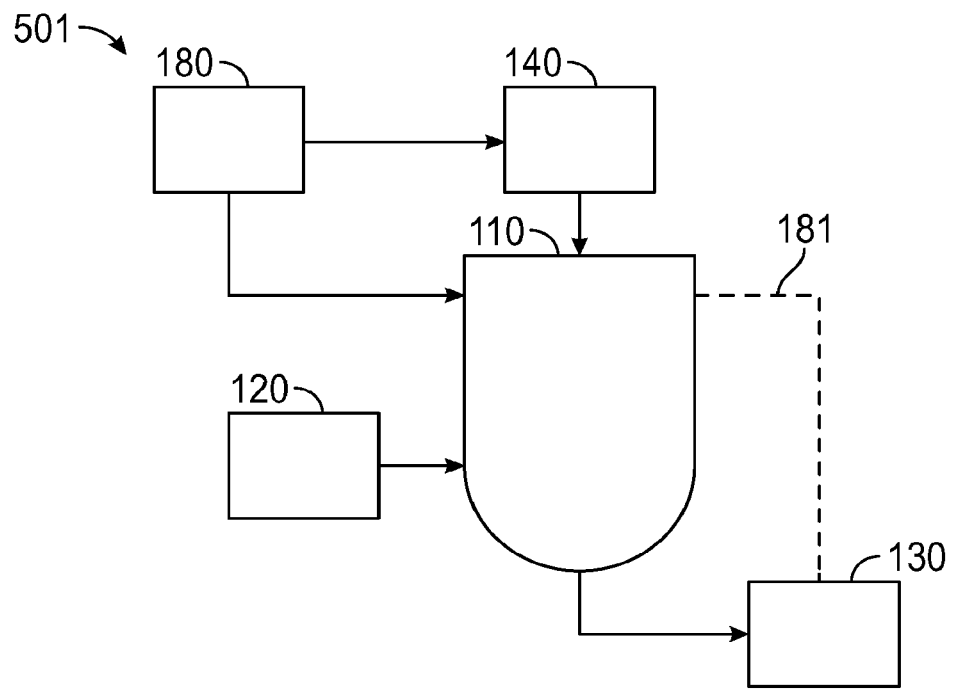
FIG. 5B is a schematic of an embodiment of a system described herein, which includes a first process gas feeder.

In some embodiments, the systems 100, 200, 201, 202, 203, 300, 400 of FIG. 1, FIG. 2A, FIG. 2B, FIG. 2C, FIG. 2D, FIG. 3, and FIG. 4, respectively, also include a first process gas feeder 180, as depicted, for example, at FIG. 5A and FIG. 5B. FIG. 5A depicts an embodiment of a system 500 including the components of FIG. 1 and a first process gas feeder 180 that is in fluid communication with the reactor 110. Although not depicted at FIG. 5A, the first process gas feeder 180 may be in direct fluid communication with the product liquid collection reservoir 130. Optionally, the process gas from the first process gas feeder 180 may be provided from the reactor 110 to the product liquid collection reservoir 130 by the line 181 depicted at FIG. 5A. FIG. 5B depicts an embodiment of a system 501 including the components of FIG. 1 and a first process gas feeder 180 that is in fluid communication with the reactor 110 and the carbonaceous material feeder 140. Although not depicted at FIG. 5B, the first process gas feeder 180 may be in direct fluid communication with the product liquid collection reservoir 130. Optionally, the process gas from the first process gas feeder 180 may be provided from the reactor 110 to the product liquid collection reservoir 130 by the line 181 depicted at FIG. 5B. Although the systems 500, 501 of FIG. 5A and FIG. 5B, respectively, include the components of the system 100 of FIG. 1, the first process gas feeder 180 may be included in any of the systems 200, 201, 202, 203, 300, 400 depicted at FIG. 2A, FIG. 2B, FIG. 2C, FIG. 2D, FIG. 3, and FIG. 4, respectively.

In some embodiments, the systems herein include a process gas feeder that may be in fluid communication with the product liquid collection reservoir.

Figure 6:
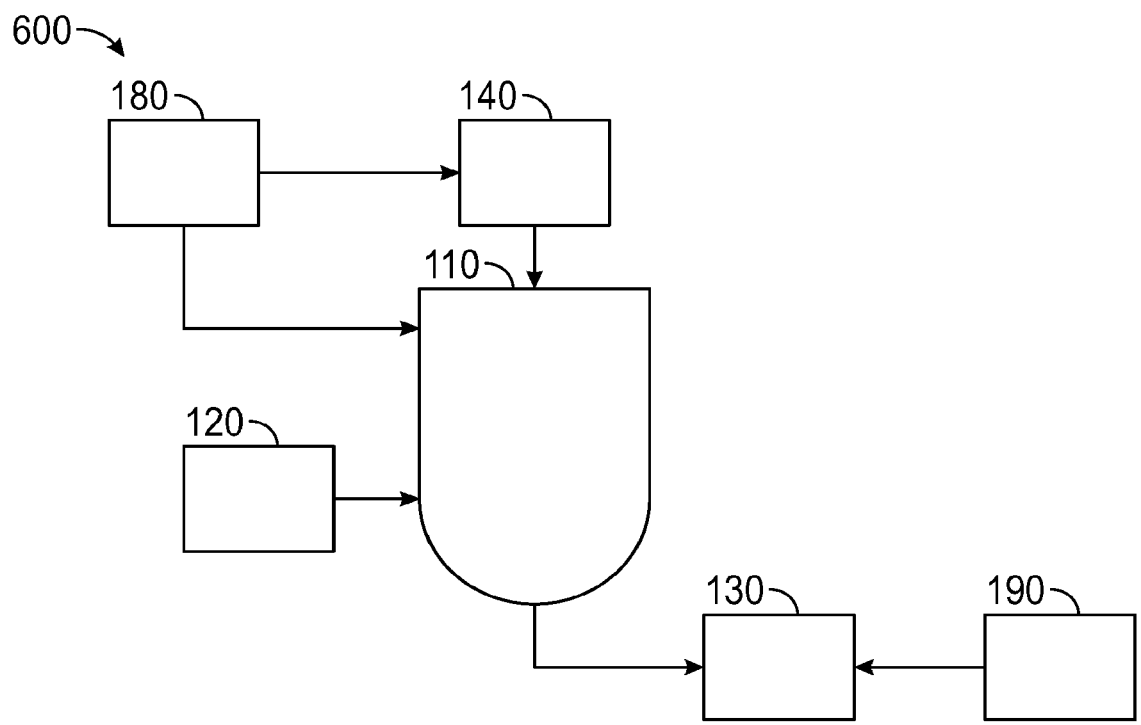
FIG. 6 is a schematic of an embodiment of a system described herein, which includes a first process gas feeder and a second process gas feeder.

In some embodiments, the system 501 of FIG. 5B includes a second process gas feeder, as depicted, for example, at FIG. 6. FIG. 6 depicts an embodiment of a system 600 that includes the components of FIG. 5B, and a second process gas feeder 190 that is in fluid communication with the product liquid collection reservoir 130. Although the system 600 of FIG. 6 includes the components of the system 501 of FIG. 5B, the second process gas feeder 190 may be included in any of the systems 200, 201, 202, 203, 300, 400, 500, 501 depicted at FIG. 2A, FIG. 2B, FIG. 2C, FIG. 2D, FIG. 3, FIG. 4, and FIG. 5A, respectively.

Hydrogen Donor Feeder

The hydrogen donor feeder may be configured to provide to the reactor a hydrogen donor. The hydrogen donor may be provided at a desired temperature, such as a temperature of at least 100° C., at least 200° C., at least 300° C., or at least 400° C.

The hydrogen donor feeder may use electromagnetic radiation. For example, the hydrogen donor feeder may include any of the systems or apparatuses described in U.S. patent application Ser. No. 17/167,275 (published under U.S. Patent Application Publication No. 2021/0243857) and International Application No. PCT/US21/16524 (published under WO 2021/158729), which are incorporated herein by reference.

In some embodiments, the hydrogen donor feeder includes an apparatus, and the apparatus includes a tube formed at least in part of an electromagnetic wave-transparent material; and an applicator, wherein (i) a first end of the tube is fixably mounted or spring mounted to the applicator, and (ii) at least a portion of the tube is arranged in the applicator. The hydrogen donor feeder also may include a susceptor material disposed in the tube, wherein at least a portion of the susceptor material in the tube is arranged in the applicator. The susceptor material may be in a particulate form. In some embodiments, a second end of the tube is fixably mounted or spring mounted to the applicator. In some embodiments, the first end of the tube is spring mounted to the applicator, the second end of the tube is spring mounted to the applicator, or both the first end of the tube and the second end of the tube are spring mounted to the applicator.

In some embodiments, the hydrogen donor feeder includes a heat exchanger in fluid communication with an apparatus.

Figure 7:
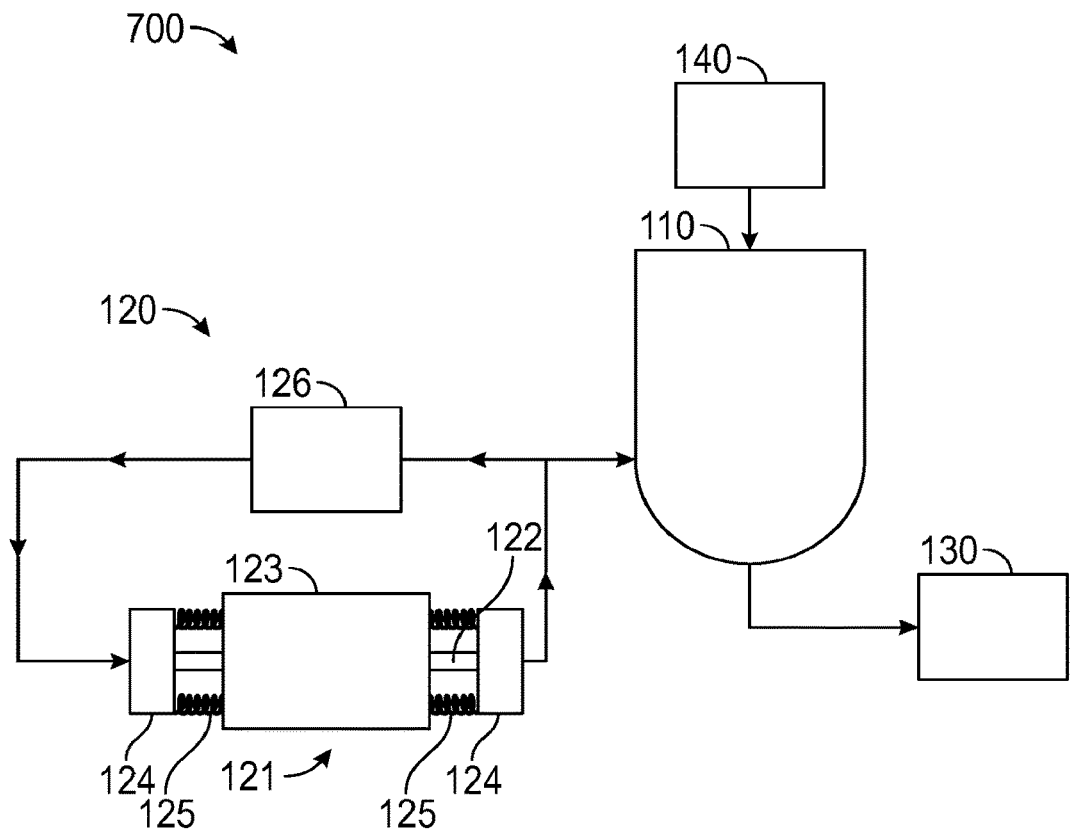
FIG. 7 is a schematic of an embodiment of a system described herein, which includes an embodiment of a hydrogen donor feeder that includes a heating apparatus and a heat exchanger.

In some embodiments, the systems 100, 200, 201, 202, 203, 300, 400, 500, 501, 600 of FIG. 1, FIG. 2A, FIG. 2B, FIG. 2C, FIG. 2D, FIG. 3, FIG. 4, FIG. 5A, FIG. 5B, and FIG. 6, respectively, also include a hydrogen donor feeder 120 as depicted at FIG. 7. FIG. 7 depicts an embodiment of a system 700 including the components of FIG. 1 and a hydrogen donor feeder 120 that includes an apparatus 121. The apparatus 121 includes a tube 122 formed at least in part of an electromagnetic wave-transparent material, and an applicator 123. A susceptor material may be disposed in the tube 122. Although both ends of the tube 122 of FIG. 7 are spring-mounted to the applicator 123 via two head units 124 and disc springs 125, other configurations are envisioned, including those described herein. The system 700 of FIG. 7 also includes a heat exchanger 126 that is in fluid communication with the apparatus 121. A hydrogen donor may be heated by the apparatus 121 and all or a portion of the heated hydrogen donor may be provided to the reactor 110, cooled via the heat exchanger 126 and return to the apparatus 121, or a combination thereof. Although the system 700 of FIG. 7 includes the components of the system 100 of FIG. 1, the hydrogen donor feeder 120 of FIG. 7 may be included in any of the systems 200, 201, 202, 203, 300, 400, 500, 501, 600 depicted at FIG. 2A, FIG. 2B, FIG. 2C, FIG. 2D, FIG. 3, FIG. 4, FIG. 5A, FIG. 5B, and FIG. 6, respectively.

The apparatuses herein may include a container. The container may define an internal volume configured to receive a susceptor material, such as particles of a susceptor material. The container may have an inlet, an outlet, or an inlet and an outlet. The inlet may be a fluid inlet for receiving the hydrogen donor in the internal volume, and the outlet may be a fluid outlet for discharging the hydrogen donor from the internal volume. An apparatus may include one container (e.g., tube) or more than one (e.g., two) containers (e.g., tube). If a tube is described herein as having a feature, then such feature may be a feature of a container; conversely, if a container is described herein as having a feature, then such feature may be a feature of a tube.

The container may be a tube. As used herein, the term "tube" refers to a container that (i) is elongated (e.g., a length:width ratio of at least 1.1:1, at least 1.5:1, or at least 2:1) or includes an elongated portion, (ii) defines an internal volume having, at any point, a cross-sectional shape that is non-polygonal (e.g., circular, elliptical, etc.), or (iii) a combination thereof.

The internal reservoir of a container, such as a tube, may be in fluid connection with the inlet and the outlet, when an inlet and outlet are present. A container, such as a tube, may be (i) straight, curved (e.g., feature one or more coils), bent, or a combination thereof, (ii) have any outer or inner cross-sectional shape (e.g., polygonal, non-polygonal, etc.) or area, or (iii) have any outer or inner dimensions. The "inner cross-sectional shape" and the "inner dimensions" may refer to the cross-sectional shape, dimensions, and/or volume capacity of the internal reservoir. The "outer or inner dimensions" are outer or inner diameters, respectively, when the tube is substantially cylindrical or the internal reservoir has a substantially circular cross-sectional shape.

A container, such as a tube, may have any outer dimension(s) and any inner dimension(s). Since a difference between the outer dimension(s) and the inner dimension(s) determine the thickness of a container's wall, the outer dimension(s) and inner dimension(s) may be selected so that a container's wall can (i) withstand one or more parameters of the methods described herein, such as pressure, (ii) permit a susceptor material to be irradiated effectively or to a desired extent with microwaves (e.g., microwaves of a certain frequency and/or wavelength), (iii) retain at least a portion of a susceptor material at a desired location, or (iv) a combination thereof. A container, such as a tube, may have an outer dimension of about 5 mm to about 3 m, about 10 mm to about 3 m, about 20 mm to about 3 m, about 50 mm to about 3 m, about 100 mm to about 3 m, about 250 mm to about 3 m, about 500 mm to about 3 m, about 1 m to about 3 m, or about 2 m to about 3 m, and an inner dimension may be selected to provide a desired thickness of a container's (e.g., tube's) wall.

In some embodiments, the tube, or at least a portion thereof, is substantially cylindrical, and has an internal reservoir having a substantially circular cross-sectional shape. As used herein, the phrase "substantially cylindrical" refers to an object or portion thereof having a substantially circular outer cross-sectional shape, wherein the smallest outer diameter of the object at any point along its length is less than its largest outer diameter at any point along its length by no more than 20% (e.g., 100 and at least 80), 15% (e.g., 100 and at least 85), 10% (e.g., 100 and at least 90), 5% (e.g., 100 and at least 95), or 1% (e.g., 100 and at least 99). As used herein, the phrase "substantially circular" refers to a shape having a smallest diameter (e.g., outer diameter of tube, inner diameter of internal reservoir) that is less than its largest diameter (e.g., outer diameter of tube, inner diameter of internal reservoir) by no more than 20% (e.g., 10 and at least 8), 15% (e.g., 10 and at least 8.5), 10% (e.g., 10 and at least 9), 5% (e.g., 10 and at least 9.5), or 1% (e.g., 10 and at least 9.9).

In some embodiments, a portion of a container, such as a tube, formed of an electromagnetic wave-transparent material is substantially cylindrical, and has an outer diameter of about 3 mm to about 200 mm, and an inner diameter of about 2 mm to about 150 mm. In some embodiments, a portion of a container, such as a tube, formed of an electromagnetic wave-transparent material is substantially cylindrical, and has an outer diameter of about 3 mm to about 150 mm, and an inner diameter of about 2 mm to about 100 mm. In some embodiments, a portion of a container, such as a tube, formed of an electromagnetic wave-transparent material is substantially cylindrical, and has an outer diameter of about 3 mm to about 75 mm, and an inner diameter of about 2 mm to about 60 mm. In some embodiments, a portion of a container, such as a tube, formed of an electromagnetic wave-transparent material is substantially cylindrical, and has an outer diameter of about 15 mm to about 75 mm, and an inner diameter of about 10 mm to about 60 mm. In some embodiments, a portion of a container, such as a tube, formed of an electromagnetic wave-transparent material is substantially cylindrical, and has an outer diameter of about 45 mm to about 60 mm, and an inner diameter of about 30 mm to about 44 mm. In some embodiments, a portion of a container, such as a tube, formed of an electromagnetic wave-transparent material is substantially cylindrical, and has an outer diameter of about 50 mm to about 54 mm, and an inner diameter of about 40 mm to about 44 mm. Other dimensions are envisioned, however, as the apparatuses herein, including the containers (e.g., tubes), may be scaled to accommodate any fluid flow. For example, a portion of a container, such as a tube, formed of an electromagnetic wave-transparent material may be substantially cylindrical, and have an outer diameter of about 0.5 m to about 3 m, about 1 m to 3 m, or about 2 m to about 3 m, and an inner diameter of about 0.4 m to about 2.9 m, about 0.9 m to about 2.9 m, or about 1.9 m to about 2.9 m.

A container (e.g., tube) may be a pressure container. A "pressure container" refers to a container configured to withstand a pressure of at least 1 bar, at least 5 bar, at least 10 bar, at least 15 bar, at least 20 bar, or at least 25 bar.

The inlet and the outlet, when present, may include a shared opening or two openings of any size and at any location that permit a fluid, such as a hydrogen donor, to enter and exit a container (e.g., tube), respectively. When, for example, the container is a tube, the tube may have an inlet arranged at a first end or a second end of the tube, and a tube may have an outlet arranged at a second end or a first end, respectively, of the tube. Alternatively, a tube may have an inlet and an outlet arranged at the first end of a tube, or an inlet and an outlet arranged at a second end of a tube. As used herein, the phrases "first end", "at a first end", "second end", "at a second end", and the like refer to regions beginning at one of the terminal points of a container, such as a tube, and extending less than or equal to 50% of the length of the container (e.g., tube) towards the opposite end of the container (e.g., tube).

A container, such as a tube, may be arranged at any orientation when present in the apparatuses and systems described herein, or when used in the methods described herein. For example, a container, such as a tube, may be arranged so that a longitudinal axis of the container (e.g., tube) is parallel (0°) to a surface (e.g., ground, floor, ceiling, wall, etc.) that supports an apparatus. As a further example, a container (e.g., tube) may be arranged so that its longitudinal axis is perpendicular (90°) to a surface (e.g., ground, floor, ceiling, wall, etc.) that supports an apparatus. In some embodiments, a container (e.g., tube) is arranged at any angle from 0° to 90° relative to a surface (e.g., ground, floor, ceiling, wall, etc.) that supports an apparatus. For example, an angle between a longitudinal axis of the container (e.g., tube) and a surface (e.g., ground, floor, ceiling, wall, etc.) that supports the apparatus may be 0° to 90° 10° to 90°, 20° to 90°, 30° to 90°, 40° to 90°, 50° to 90°, 60° to 90°, 70° to 90°, or 80° to 90°. Therefore, when a container (e.g., tube) includes an inlet and an outlet, the container's inlet and outlet may be arranged at the same or different heights relative to a surface (e.g., ground, floor, ceiling, etc.) that supports an apparatus. For example, an inlet of a tube may be arranged closer to a supporting surface than an outlet of the container, thereby allowing the container (e.g., tube) to operate in "upflow" mode. Alternatively, an outlet of a container (e.g., tube) may be arranged closer to a supporting surface than an inlet of the container (e.g., tube), thereby allowing the container (e.g., tube) to operate in "downflow" mode.

A container (e.g., tube) may be of any length, i.e., the distance of a straight line from a terminal point of the first end or, if present, first cap to the second end or, if present, second cap of the container (e.g., tube). A container (e.g., tube), for example, may have a length of about 0.1 m to about 5 m, about 0.1 m to about 4 m, about 0.1 m to about 3 m, about 0.5 m to about 3 m, about 0.5 m to about 2 m, about 0.5 m to about 1.5 m, or about 1 m to about 1.5 m. Other lengths are envisioned, however, as the apparatuses herein, including the containers, may be scaled to accommodate any fluid flow.

A container (e.g., tube) may include (e.g., be formed of) any material that permits a susceptor material in the container to be irradiated with electromagnetic waves, such as microwaves. In some embodiments, a container, at least in part, is formed of one or more materials that include an electromagnetic wave-transparent material. As used herein, the phrase "electromagnetic wave-transparent material" refers to materials that remain substantially unheated (i.e., a temperature increase of less than or equal to 5%) when irradiated with one or more types of electromagnetic waves, such as those described herein, for a time sufficient to increase the temperature of 1 L of water (originally at ambient temperature) by at least 5%. In other words, the electromagnetic wave-transparent material is transparent with regard to the one or more types of electromagnetic waves selected for use, and not necessarily all electromagnetic waves. In some embodiments, a container (e.g., tube), at least in part, is formed of one or more materials that include a microwave-transparent material. As used herein, the phrase "microwave-transparent material" refers to materials, typically low-loss dielectric materials, that remain substantially unheated (i.e., a temperature increase of less than or equal to 5%) when irradiated with microwaves for a time sufficient to increase the temperature of 1 L of water (originally at ambient temperature) by at least 5%. An electromagnetic wave-transparent material, such as a microwave-transparent material, may be selected from ceramic, polymer, glass, fiberglass, an inorganic compound (e.g., a mineral), or a combination thereof. In some embodiments, the inorganic compound includes fused silica, which may be commonly referred to as quartz. In some embodiments, the electromagnetic wave-transparent material, such as a microwave-transparent material, includes silicon nitride. In some embodiments, the electromagnetic wave-transparent material, such as a microwave-transparent material, includes a ceramic. In some embodiments, the ceramic includes silicon, aluminum, nitrogen, and oxygen, which may be referred to as a "SiAlON" ceramic. In some embodiments, the ceramic includes alumina. The alumina may be a commercially available alumina, which may include up to 10%, by weight, up to 5%, by weight, or up to 1%, by weight, of impurities, such as silica, calcia, magnesia, iron oxide, sodium oxide, titania, chromic oxide, potassium oxide, boron oxide, or a combination thereof. In some embodiments, the alumina is 99.8% alumina (McDaniel Advanced Ceramic Technologies, Pennsylvania, USA).

A container (e.g., tube) may be formed from one or more materials. For example, at least a portion of tube that is arranged in an applicator may be formed of one or more electromagnetic wave-transparent materials, while one or more other materials may be used to form the remainder of the container. For example, a container may be formed of a ceramic and a metal.

In some embodiments, the container (e.g., tube) is a monolithic structure formed of one or more electromagnetic wave-transparent materials. As used herein, the phrase "monolithic structure" refers to a structure formed of a single piece of a material (e.g., ceramic, metal, etc.). A container having a monolithic structure, for example, may be a tube that includes a single tube-shaped piece formed entirely of a ceramic. The ceramic monolithic structure may include an inlet and an outlet at a first end and second end, respectively. In some embodiments, a monolithic structure includes one or more structural features (e.g., a depression, groove, ridge, flange, etc.) to accommodate another part of the apparatuses provided herein, such as a clamp or other part of a head unit. A monolithic structure, however, may lack one or more structural features configured to accommodate another part of the apparatuses provided herein.

In some embodiments, the container (e.g., tube) includes a first cap arranged at the first end of the container (e.g., tube), a second cap arranged at the second end of the container (e.g., tube), or a first cap and a second cap arranged at the first end and the second end of the container (e.g., tube), respectively. In some embodiments, the inlet of the container (e.g., tube) is provided by the first cap. In some embodiments, the outlet of the container (e.g., tube) is provided by the second cap. For example, the first cap and/or the second cap may define an aperture that permits fluid, such as a hydrogen donor, to enter or exit an internal reservoir of a container (e.g., tube), respectively. The first cap and/or second cap may be formed of any material. In some embodiments, the first cap and/or second cap is formed of a material having a coefficient of thermal expansion that is identical or similar (e.g., within 10%) to the coefficient of thermal expansion of an electromagnetic wave-transparent material, such as a microwave-transparent material, of a container (e.g., tube). In some embodiments, the first cap and/or the second cap are formed of a metal. The metal may be an alloy, such as an alloy including iron, cobalt, and nickel (e.g., a KOVAR® alloy). In some embodiments, the first cap and/or the second cap includes a metal, a portion of the tube includes a ceramic, and the first cap, the second cap, or both the first cap and the second cap are adjoined in any manner, including a manner that forms a seal between the tube and the first cap, second cap, or both the first cap and the second cap. For example, a container (e.g., tube) may be adjoined to a first cap, a second cap, or a first cap and a second cap by (i) a ceramic-to-metal braze, (ii) an adhesive, (iii) securing a threaded end of a tube into a first cap and/or second cap, which may also be threaded, or (iv) a combination thereof. The braze may result in a seal, which may be sufficient to withstand one or more parameters of the methods described herein, such as pressure. In some embodiments, a portion of the container (e.g., tube) includes alumina, and the first cap, the second cap, or both the first cap and the second cap includes KOVAR® alloy. The KOVAR® alloy may be adjoined to a ceramic, such as alumina, by (i) a ceramic-to-metal braze, (ii) threading on one or both of the ceramic and KOVAR® alloy, or (iii) a combination thereof. The adhesive may be a ceramic adhesive, such as those that are commercially available from Sauereisen, Inc. (PA, USA). The first cap and/or second cap generally may have any shape. For example, a first cap and/or a second cap may have a feature (e.g., a depression, groove, ridge, flange, etc.) that corresponds to another part of a container (e.g., tube), system, or apparatus herein. In some embodiments, a first cap and/or second cap includes one or more features (e.g., a depression, a groove, ridge, flange, etc. of any polygonal or non-polygonal shape), which may permit the first cap and/or the second cap to accommodate a clamp or other device, which may be used as, or as part of, a seal as described herein, such as a seal between the first cap and/or the second cap to another part (e.g., a head unit) of the apparatuses or systems herein.

The outer dimensions of a container (e.g., tube) may be selected to conform with the dimensions of an applicator. An applicator, for example, may include a structure that defines one or more apertures in which a tube is arranged. The container (e.g., tube) may have an outer dimension that permits the container (e.g., tube) to contact at least a portion of one or more apertures of an applicator. The container (e.g., tube) may have an outer dimension that is about 0.1 mm to about 10 mm, about 0.1 mm to about 5 mm, about 2 mm to about 4 mm, or about 3 mm to about 3.5 mm less than a corresponding dimension of an aperture of an applicator. An applicator may include one or more chambers defined by walls, wherein each of the walls define an aperture in which a tube is arranged, and a relatively small difference between the outer dimension of the tube and the dimension of the aperture may reduce or eliminate microwave leakage.

As used herein, the phrases "fixably mounted", "fixably adjoined", and the like describe an affixed or secured connection that is configured to be non-elastic, including a connection that (i) is configured to be permanent (e.g., two objects are welded together, or an object, upon formation, includes two features, such as a second cap that includes a microwave disruptor), and/or (ii) includes one or more fasteners or features that (a) are (1) not removable by hand (e.g., a threaded fastener tightened with a tool, some types of adhesive, a tightened collar, a material providing friction between two objects, etc.) or (2) removable by hand without the aid of a loosening tool (e.g., objects connected by corresponding male and female features, such as a tab and slot, a ridge and groove, some types of adhesives, a material providing friction between objects, etc.), and/or (b) can withstand without failing one or more parameters of the methods herein, such as pressure, heat, force(s) imparted by thermal expansion, etc.

An apparatus, system, or part thereof, such as a tube, may include one or more retention devices to (i) prevent a susceptor material from escaping an internal reservoir and/or cap of a container (e.g., tube), (ii) control a location of a susceptor material in an apparatus, system, or part thereof, such as an internal reservoir, cap, head unit, etc., (iii) prevent a susceptor material from contacting a fluid, or (iv) a combination thereof. The one or more retention devices may include a material that is permeable or impermeable to a fluid disposed in the inlet of a container (e.g., tube). The one or more retention devices may be located at any position in a system or apparatus. The one or more retention devices may be (i) disposed in or adjacent an internal volume defined by a container, such as a tube, and/or (ii) configured to retain the susceptor particles in the internal volume defined by a container while allowing a fluid to flow out of the internal volume. In some embodiments, the retention device includes a membrane. In some embodiments, the retention device includes a plurality of openings through which a fluid can pass, but a susceptor material, such as susceptor particles, cannot pass. In some embodiments, the one or more retention devices include a screen. The retention device (e.g., membrane, screen, etc.), which may include a frame, may be positioned (e.g., fixably mounted) (i) in or adjacent to a container (e.g., tube), for example, at one or both ends of an internal reservoir, in a cap, or adjacent to a cap, (ii) in or adjacent to a head unit (e.g., in a head unit, between a head unit and cap, and/or in a pipe or other device through which a fluid exits a head unit), or (iii) a combination thereof. Any sieve designation may be selected for the retention device; for example, the retention device may have any suitable mesh number. In some embodiments, the retention device is a screen having a mesh number from 4 to 400, 10 to 200, 20 to 100, or 20 to 50. In some embodiments, the retention devices includes a 30-mesh screen. In some embodiments, the average open area of the openings in the retention mechanism is less than 20 square mm, 15 square mm, 10 square mm, 5 square mm, or 2 square mm. In some embodiments, the retention device includes a screen coupled to the container, a perforated plate coupled to the container, or a perforated wall of the container. In some embodiments, the at least one retention device includes a first retention structure position proximate to a fluid inlet of a container (e.g., tube) and a second retention structure position proximate to the fluid outlet. In addition to being permeable to a fluid, such as a hydrogen donor, disposed in the inlet of a container (e.g., tube), the one or more retention devices also may accommodate, via an aperture or otherwise, one or more other components of a container (e.g., tube), such as a microwave disruptor. A microwave disruptor, for example, may include a portion that is arranged in an aperture defined by the one or more retention devices. In some embodiments, the one or more retention devices include one or more housings formed, at least in part, of an electromagnetic wave-transparent material, such as a microwave transparent material, which may be (i) impermeable to a fluid, and (ii) identical to or different than the electromagnetic wave-transparent material of a tube. A susceptor material may be disposed in the one or more housings. A housing generally may have any shape, and a container (e.g., tube) may include one or more housings in which a susceptor material is disposed. In some embodiments, a housing in which a susceptor material is disposed is an elongated housing having a length:width ratio of at least 3:1 (e.g., cylindrical in shape), thereby forming a "tube-within-a-tube" configuration in which a fluid, such as a hydrogen donor, traverses an area defined at least in part by an outer surface of the elongated housing and an inner surface of the tube. In some embodiments, two or more of the elongated housings are arranged, in any manner, in a container (e.g., tube). In some embodiments, the one or more housings include one or more capsules having a length:width ratio of less than 3:1 (e.g., spherical, elliptical, square, rectangular in shape) arranged, in any manner, in a container (e.g., tube). The susceptor material disposed in a housing may be in any form, including those described herein, such as a particulate form, monolithic form, or a combination thereof.

Applicator

The apparatuses herein may include an applicator, such as a microwave applicator. The applicators may include any devices to which a container (e.g., tube) is mounted in any manner while a susceptor material is irradiated with a plurality of electromagnetic waves, such as a plurality of microwaves. The plurality of electromagnetic waves introduced into an applicator may include a plurality of radio waves, a plurality of microwaves, a plurality of infrared waves, a plurality of gamma rays, any other type of electromagnetic wave, or a combination thereof. A plurality of electromagnetic waves may be generated, at least in part, by a laser. Any of the applicators provided herein—including those referred to (i) as a "microwave applicator", (ii) as hosting microwaves, or (iii) used with one or more microwave generators—may be used with each of the foregoing types of electromagnetic waves.

One or more containers (e.g., tubes) may be arranged at least partially in an applicator. At least a portion of a container (e.g., tube) and/or at least a portion of a susceptor material is arranged "in" an applicator when located at a position that permits at least a portion of electromagnetic waves disposed in the applicator to contact, traverse, and/or irradiate the at least a portion of the container and/or the at least a portion of the susceptor material, respectively. In some embodiments, an applicator includes more than one component, and the one or more containers (and, if present, a susceptor material in the one or more containers) are arranged at least partially in the component of the applicator in which electromagnetic waves are disposed (e.g., a vessel, modular unit, etc.). For example, one container, two containers, three containers, four containers, or more, may be arranged at least partially in an applicator. Each container may be independently arranged entirely or partially in an applicator. For example, when a container is a tube, the tube may be arranged completely within the applicator (e.g., none of the tube protrudes from the applicator), or partially within the applicator (e.g., a first end or both the first and second ends of the tube protrude from the applicator).

An applicator may include a single piece to which a container (e.g., tube) is mounted and in which electromagnetic waves, such as microwaves, are introduced (e.g., a vessel, modular unit, etc.). Alternatively, an applicator may include two or more pieces, such as a vessel or modular unit in which microwaves are introduced and at least one separate piece, such as a mounting apparatus, as described herein (e.g., a separate bracket and/or other structure (e.g., a pedestal, elongated support (e.g., a hanger, a wire, rod, cable rope, chain, piping (such as piping placing components of a system in fluid communication, etc.), etc.) to which a container (e.g., tube) is mounted in any manner. An applicator may include a vessel and at least one separate piece, and the vessel and at least one separate piece may be arranged at the same or different locations. For example, a vessel may be positioned on a floor, pedestal, first support, etc., and the at least one separate piece (to which the tube may be mounted in any manner) may be positioned at, or extend from, the floor, pedestal, support, or another location, such as the ceiling, wall, a second pedestal, a second support, etc.

In some embodiments, the applicator includes a vessel having a first end and a second end, and including one or more chambers defined by one or more outer walls of the vessel, one or more walls inside the vessel, or a combination thereof. The first end and second end of the vessel may include, for example, any two opposite outer walls of the vessel. The first end of the vessel, the second end of the vessel, the one or more walls inside the vessel, or a combination thereof may define an aperture. The aperture(s) may accommodate a tube. For example, a tube may be arranged in the apertures defined by (a) the first end of the vessel, (b) the second end of the vessel, (c) the one or more walls inside the vessel, or (d) a combination thereof.

In some embodiments, the applicator includes one, one to thirty, one to twenty-five, one to fifteen, one to ten, two to ten, two to eight, four to eight, or four to six chamber(s). A microwave generator may be positioned to introduce a plurality of microwaves into a chamber. The number of chambers may be greater than, equal to, or less than the number of microwave generators. A plurality of electromagnetic waves, such as microwaves, may be introduced into a chamber (i) via an aperture defined by an outer wall of the vessel, (ii) by a component of a microwave generator disposed in a chamber, (iii) by a component of a microwave generator disposed in a waveguide, or (iv) a combination thereof. As used herein, the phrase "microwave generator" refers to devices that generate microwaves, including the components of the devices, such as an antenna, coaxial cable, transmission lines, etc. In some embodiments, an electromagnetic wave emission structure includes one or more components of a microwave generator, such as an antenna, coaxial cable, etc. When the methods described herein are performed with electromagnetic waves other than microwaves, the "microwave generators" may be replaced with generators of the other types of electromagnetic waves provided herein.

As used herein, the phrase "introduced into a chamber via an aperture defined by an outer wall of the vessel" refers to and includes introducing microwaves with a microwave generator positioned outside of a chamber, and introducing the microwaves into a chamber via an aperture defined by an outer wall of the vessel. Prior to traversing the aperture, the microwave may pass through a waveguide, coaxial cable, or other transmission line.

As used herein, the phrase "introduced into a chamber by a microwave generator disposed in a chamber" refers to introducing microwaves in a chamber with a microwave generator having at least one component, such as an antenna, that is arranged in a chamber. Other components of such a microwave generator may be arranged outside of the chamber, and may be connected, via a cable, to the one or more components, such as an antenna, that are arranged in the chamber. When microwaves are introduced inside a chamber with an antenna or otherwise, the microwaves may not pass through a waveguide arranged outside of chamber, and the chamber, therefore, may not include a waveguide.

As used herein, the phrase "introduced into a chamber by a microwave generator disposed in a waveguide" refers to generating microwaves with a microwave generator having at least one component, such as an antenna, that is arranged in a waveguide. Other components of such a microwave generator may be arranged outside of the waveguide, and may be connected, via a cable, to the one or more components, such as an antenna, that are arranged in the waveguide. When microwaves are generated inside a waveguide with an antenna or otherwise, the microwaves, before entering the chamber via an aperture defined by an outer wall of the vessel, may traverse at least a portion of the waveguide, including the portion of the waveguide that exists between (i) the component of the microwave generator in the waveguide and (ii) the chamber or aperture of the chamber.

In some embodiments, at least one of the one or more microwave generators is positioned to introduce a plurality of microwaves into at least one of the chambers. Each chamber may be associated with one or more microwave generators. In some embodiments, a first, second, third, etc. microwave generator is positioned to introduce a plurality of microwaves into a first, second, third, etc. chamber, respectively. In some embodiments, the number of chambers exceeds the number of microwave generators. Therefore, a microwave generator may not be positioned at every chamber. In some embodiments, the apparatus includes three to six microwave generators, and four to six chambers. In some embodiments, the number of chambers is less than the number of microwave generators. Therefore, two or more microwave generators may be positioned at one or more of the chambers. The chambers of an applicator may be single mode chambers or multimode chambers. In some embodiments, the chambers of an applicator including a vessel are multimode chambers.

In some embodiments, a susceptor material is irradiated with a plurality of electromagnetic waves that includes electromagnetic waves other than microwaves, and these non-microwave electromagnetic waves may be produced by one or more sources (e.g., a generator, an antenna, etc.) that may be located at any one or more of the locations that are described herein for a microwave generator.

The applicators also may include one or more waveguides. As used herein, the term "waveguide" refers to a device that is (i) arranged between a microwave generator and a chamber, and (ii) includes a passageway through which microwaves pass prior to entering a chamber, wherein the passageway is structured to reduce or eliminate energy loss of the microwaves as they traverse the passageway. A waveguide, therefore, may have any external shape, and the shape and dimensions of the passageway may be configured to reduce or eliminate energy loss of microwaves. When a waveguide is present, it may extend from and/or be attached at or near an aperture of a chamber. A microwave generator may be positioned and/or attached to the other end of the waveguide. The aperture of the chamber from which a waveguide extends and/or is attached may be at least partially covered with an electromagnetic-wave transparent material (e.g., a microwave-transparent material), such as a tile of alumina, TEFLON® polytetrafluoroethylene, fused silica, etc. In some embodiments, a waveguide is arranged between each chamber and microwave generator. One or more of the waveguides may include at least one tuning screw, which may be a feature that permits impedance matching.

An applicator may include a solid state microwave applicator. A solid state microwave applicator may include at least one antenna, a power component, and a cable (e.g., a coaxial cable) connecting the power component and each of the least one antenna. One or more antenna may be arranged in a chamber of the applicators disclosed herein, and a wall at least partly defining each chamber may define an aperture that may accommodate a cable of a solid state microwave applicator. For example, an applicator may include six chambers, and any number of the six chambers may include at least one antenna, and the antenna may be connected to one or more power components. One or more antenna may be arranged in a waveguide of the applicators disclosed herein, and any wall defining each waveguide may define an aperture that may accommodate a cable of a solid state microwave applicator. For example, an applicator may include six waveguides, and any number of the six waveguides may include at least one antenna, and the antenna may be connected to one or more power components. As a further example, an applicator may include six chambers and one to six waveguides, and any number of the six chambers and one to six waveguides may include at least one antenna, and the antenna may be connected to one or more power components.

An applicator also may be formed of one modular applicator unit, or at least two modular applicator units. In some embodiments, the applicator includes one to thirty modular applicator units, one to twenty-five modular applicator units, one to twenty modular applicator units, one to fifteen modular applicator units, one to ten modular applicator units, two to ten modular applicator units. In some embodiments, the applicator includes four to six of the modular applicator units.

Each modular unit may include (i) a chamber having a first side and a second side, (ii) a first aperture defined by the first side, (iii) a second aperture defined by the second side, and (iv) a waveguide extending from a third aperture of the chamber. Each modular applicator unit of an applicator may be identical, or at least two of the modular applicator units may differ in any manner, such as the dimensions of a chamber, the dimensions of a waveguide, the orientation of a chamber, waveguide, and/or aperture, or a combination thereof. Whether identical or different, any two modular units of an applicator may be oriented in the same manner. The chamber of each modular unit may be a single mode chamber or a multimode chamber. In some embodiments, the chamber of each modular unit is a single mode chamber.

In some embodiments, at least two of the modular applicator units are arranged adjacent to each other, and a tube is arranged in the first and second apertures of the adjacent modular applicator units. In some embodiments, one to thirty modular applicator units, or two to ten modular applicator units are arranged adjacent to each other, and the tube is arranged in the first aperture and the second aperture of each modular applicator unit. When two modular applicator units are adjacent to each other, the two modular applicator units may or may not contact each other. When two modular applicator units contact each other, the two modular applicator units may be adjoined in any manner. For example, two modular applicator units may be fixably mounted to each other. In some embodiments, the modular applicator units include one or more structural features, such as corresponding male and female structural features, which may permit or ease the arrangement and/or adjoining of two modular applicator units.

In some embodiments, at least one of the one or more microwave generators is positioned to introduce a plurality of microwaves into at least one of the one to thirty modular applicator units. In some embodiments, the apparatus includes three to six microwave generators, and the applicator is an applicator that includes four to six of the modular applicator units.

A tube may be mounted to an applicator in any manner. As described herein, a tube can be mounted to an applicator by mounting (i) a portion of the tube, such as a cap, to an applicator, and/or (ii) a separate device that contacts a tube, such as a head unit, to an applicator. In some embodiments, a tube is spring mounted to an applicator. In some embodiments, a tube is fixably mounted to an applicator. In some embodiments, one part of a tube, such as a first end, is fixably mounted or spring mounted to an applicator, and another part of the tube, such as a second end, is fixably mounted or spring mounted to an applicator.

When a tube is mounted, either fixably mounted or spring mounted, to an applicator, a part of the tube, such as a first cap or second cap, or another part of the apparatus, such as a first or second head unit in contact with a tube, may be mounted (i) directly to a vessel of an applicator or one of the modular applicator units of the applicator, or (ii) to another part of the applicator, such as a mounting apparatus. The mounting apparatus may be a separate part (i.e., not connected to a vessel or modular applicator unit) that permits a portion of a tube to be mounted to an applicator. Non-limiting examples of mounting apparatuses include the pedestals, brackets, and elongated supports (e.g., hangers, chains, cables, ropes, wires, piping, hoses, etc.). Therefore, the mounting apparatuses may include piping, hoses, or any connecting lines used in the systems provided herein.

As used herein, the phrase "spring mounted" describes a connection between two objects that is configured to be elastic, and, therefore, allows a first of the two objects to (i) move relative to the second object upon the application of a force to the first object, and (ii) return to a position at or near its original position upon removal of the force. A force, for example, may be applied by the expansion of part of an apparatus, such as a tube, that may occur during heating. When an end of a tube is spring mounted to an applicator, the apparatuses herein may include one or more devices for detecting (i) a force imparted by the thermal expansion of a tube, (ii) a distance a spring mounted object moves, or (iii) a combination thereof. For example, a distance-detecting laser may be fixably mounted to a spring mounted object (e.g., a head unit as described herein), and a change in distance determined by the laser and a spring constant may be used to calculate force. As a further example, a load cell may be used to detect or determine one or more forces.

In some embodiments, (i) the first end of a tube is spring mounted to an applicator, (ii) the second end of a tube is fixably mounted to an applicator, (iii) the first end of a tube is spring mounted to an applicator and the second end of a tube is fixably mounted to an applicator, (iv) the first end of a tube is fixably mounted to an applicator, (v) the second end of a tube is spring mounted to an applicator, (vi) the first end of a tube is fixably mounted to an applicator and the second end of a tube is spring mounted to an applicator, or (vii) the first end of a tube is spring mounted to an applicator and the second end of a tube is spring mounted to an applicator.

The apparatuses herein may include at least one head unit that is configured to (i) contact a tube, such as an end of a tube, and (ii) be mounted in any manner to an applicator. A head unit, for example, may be mounted to a vessel, a modular applicator unit, or a mounting apparatus. A head unit may be mounted with one or more fasteners, such as a threaded fastener (e.g., a threaded or partially threaded bolt, screw, etc.). When a threaded or partially threaded fastener is used to secure a component to an applicator, the applicator may include a corresponding feature for receiving the threaded or partially threaded fastener, such as a threaded or partially threaded depression, a threaded or partially threaded socket protruding from the applicator, an aperture in which the fastener is arranged and secured with a nut, etc. In some embodiments, a head unit is mounted with one to thirty fasteners, one to twenty-five fasteners, one to twenty fasteners, one to fifteen fasteners, one to ten fasteners, one to eight fasteners, one to six fasteners, one to four fasteners, one to three fasteners, two fasteners, or one fastener. A head unit may be mounted by welding. A head unit may be an integral component of a vessel or modular applicator unit of an applicator. An apparatus may include one head unit, two head units, or more, and any feature described herein of "a first head unit" or "a second head unit" may be a feature of "a second head unit" or "a first head unit", respectively, or any other head unit.

In some embodiments, the apparatuses herein include (i) a first head unit that defines a first aperture, (ii) a first fastener having a first end and a second end, wherein the first fastener is slidably arranged in the first aperture, and the second end of the first fastener is fixably mounted to the applicator, and (iii) a first elastically compressible apparatus arranged between the first head unit and the first end and/or second end of the first fastener.

In some embodiments, the apparatuses herein include (i) a first head unit that defines a first aperture and a second aperture, (ii) a first fastener having a first end and a second end, wherein the first fastener is slidably arranged in the first aperture, and the second end of the first fastener is fixably mounted to the applicator, (iii) a second fastener having a first end and a second end, wherein the second fastener is slidably arranged in the second aperture, and the second end of the first fastener is fixably mounted to the applicator, (iv) a first elastically compressible apparatus arranged between the first head unit and the first end and/or the second of the first fastener; and (v) a second elastically compressible apparatus arranged between the first head unit and the first end and/or second end of the second fastener, wherein the first end of the tube and first head unit contact each other. In some embodiments, the apparatus also includes (i) a third aperture defined by the first head unit, (ii) a third fastener having a first end and a second end, wherein the third fastener is slidably arranged in the third aperture, and the second end of the third fastener is fixably mounted to the applicator, (iii) a third elastically compressible apparatus arranged between the first head unit and the first end and/or second end of the third fastener. In some embodiments, the apparatus also includes (i) a fourth aperture defined by the first head unit, (ii) a fourth fastener having a first end and a second end, wherein the fourth fastener is slidably arranged in the fourth aperture, and the second end of the fourth fastener is fixably mounted to the applicator, and (iii) a fourth elastically compressible apparatus arranged between the first head unit and the first end and/or second end of the fourth fastener. When more than four fasteners having a first end and a second end are used to mount a head unit, then an elastically compressible apparatus may be arranged between the first head unit and each of the first ends and/or second ends of the more than four fasteners.

As used herein, the phrases "slidably mounted", "slidably arranged", and the like describe a connection between two objects that facilitates movement of at least one of the objects relative to the other object, either freely or upon the application of a force.

As used herein, the phrase "elastically compressible apparatus" refers to an active or passive apparatus that is configured to deviate from an original shape and/or position and return to the original shape and/or position upon application or removal of one or more forces. Generally, the elastically compressible apparatuses may be arranged at any position in the apparatuses provided herein (e.g., between a head unit and a vessel, between a head unit and a spacer block, between a head unit and a first end of a faster, between a head unit and a second end of a fastener, etc.). The elastically compressible apparatuses may be located at positions to accommodate the expansion of any component of the apparatuses provided herein, including, but not limited to, a tube, a head unit, a spacer block, etc. The elastically compressible apparatuses (such as the first, second, third, and fourth elastically compressible apparatuses) may be the same or different. The elastically compressible apparatuses (such as the first, second, third, and fourth elastically compressible apparatuses) may include a spring, a pneumatic apparatus, such as a pneumatic piston, a hydraulic apparatus, such as a hydraulic cylinder, etc. The spring may include a coiled spring. The spring, in some embodiments, includes one or more disc springs slidably mounted on one or more fasteners, such as the first fastener, the second fastener, the third fastener, or the fourth fastener, respectively. The spring, in some embodiments, includes two or more disc springs slidably mounted on one or more fasteners, such as the first fastener, the second fastener, the third fastener, or the fourth fastener, respectively. In some embodiments, 1 to 1,000, 1 to 750, 1 to 500, 1 to 250, 1 to 100, 1 to 50, 1 to 25, or 2 to 24 disc springs are slidably mounted on the one or more fasteners, such as the first fastener, the second fastener, the third fastener, or the fourth fastener, respectively.

In some embodiments, the head unit includes at least one plate, and a portion configured to receive an end of a tube. In some embodiments, the apparatus includes a first head unit that includes (i) a portion configured to receive an end of a tube, and (ii) a plate that defines a first aperture, (iii) a first fastener having a first end and a second end, wherein the first fastener is slidably arranged in the first aperture, and the second end of the first fastener is fixably mounted to the applicator, and (iv) a first elastically compressible apparatus arranged between the plate and the first end and/or second end of the first fastener, wherein the portion configured to receive an end of a tube is (a) arranged between the applicator and the plate, and (b) in contact with the plate and the tube. The portion configured to receive an end of a tube may include a non-flat surface (e.g., rounded, curved, tapered, etc.) that contacts the plate. The plate may have a substantially flat surface that contacts a non-flat surface of the portion configured to receive an end of a tube. The non-flat surface may permit the portion configured to receive an end of a tube to move relative to the plate when a force is applied to the portion configured to receive an end of a tube, such as a force that may be applied during the methods described herein. The plate may include a non-flat surface (e.g., rounded, curved, tapered, etc.) that contacts the portion configured to receive an end of a tube. The portion configured to receive an end of a tube may have a substantially flat surface that contacts a non-flat surface of plate. The non-flat surface of the plate may permit the portion configured to receive an end of a tube to move relative to the plate when a force is applied to the portion configured to receive an end of a tube, such as a force that may be applied during the methods described herein. In some embodiments, the portion configured to receive an end of a tube includes a flat surface that contacts a corresponding flat surface of the plate.

In some embodiments, the apparatus includes a first head unit that includes (i) a portion configured to receive an end of a tube, and (ii) a plate that defines a first aperture and a second aperture, a first fastener having a first end and a second end, wherein the first fastener is slidably arranged in the first aperture, and the second end of the first fastener is fixably mounted to the applicator, a second fastener having a first end and a second end, wherein the second fastener is slidably arranged in the second aperture, and the second end of the first fastener is fixably mounted to the applicator, a first elastically compressible apparatus arranged between the plate and the first end and/or second end of the first fastener, and a second elastically compressible apparatus arranged between the plate and the first end and/or second end of the second fastener, wherein the portion configured to receive an end of a tube is (a) arranged between the applicator and the plate, and (b) in contact with the plate and the tube. In some embodiments, the apparatus includes a third aperture defined by the plate, a third fastener having a first end and a second end, wherein the third fastener is slidably arranged in the third aperture, and the second end of the third fastener is fixably mounted to the applicator, and a third elastically compressible apparatus arranged between the plate and the first end and/or second end of the third fastener. In some embodiments, the apparatus includes a fourth aperture defined by the plate, a fourth fastener having a first end and a second end, wherein the fourth fastener is slidably arranged in the fourth aperture, and the second end of the fourth fastener is fixably mounted to the applicator, and a fourth elastically compressible apparatus arranged between the plate and the first end and/or second end of the fourth fastener. The first, second, third, and fourth elastically compressible apparatus may be the same or different. In some embodiments, the first, second, third, or fourth elastically compressible apparatus includes one or more disc springs slidably mounted on the first fastener, the second fastener, the third fastener, or the fourth fastener, respectively, of the first head unit. In some embodiments, the apparatus includes 1 to 1,000, 1 to 750, 1 to 500, 1 to 250, 1 to 100, 1 to 50, 1 to 25, or 2 to 24 disc springs slidably mounted on the first fastener, the second fastener, the third fastener, or the fourth fastener, respectively, of the first head unit.

In some embodiments, the one or more disc springs of the apparatuses herein include KEY BELLEVILLES® disc springs (USA), which may be commonly referred to as "BELLEVILLE® Washers".

A first head unit may contact a portion of a tube, such as a first end of a tube. The first head unit may include a first seal, wherein a portion of a tube, such as a first end of a tube, contacts the first seal. The first seal may include any known seal, and may be selected to prevent or eliminate the likelihood of fluid leakage, and/or withstand one or more parameters of the methods herein, such as pressure. The first seal may be arranged at any position that allows it to contact a first end of a tube and a first head unit. For example, a first seal may (i) circumvent an outer surface of a tube (e.g., a circumference of a substantially cylindrical tube), (ii) contact a terminal portion of a tube (e.g., a surface defining an inlet), or (iii) a combination thereof.

In some embodiments, the first seal includes rubber. For example, the first seal may include a rubber ring, which may be substantially circular when the portion of the tube, such as a first end (e.g., first cap), that contacts the first head unit is substantially cylindrical. In some embodiments, the first seal includes metal, such as a metal ring. In some embodiments, a first head unit includes a depression configured to receive a portion of a tube, such as a first end of the tube (e.g., first cap). The first seal, when present, may be arranged in the depression. In some embodiments, the first head unit includes a depression configured to receive at least a portion of a seal, and a seal is arranged in the depression of the first head unit. In some embodiments, the tube (e.g., a cap) includes a depression configured to receive at least a portion of a seal, and a seal is arranged in the depression of the tube. The depression of the tube may be located in a cap or other portion of the tube, and may, in some embodiments, circumvent an outer surface of the tube (e.g., a circumference of a substantially cylindrical tube). In some embodiments, the first head unit includes a depression configured to receive a first portion of a seal, and a tube (e.g., a cap) includes a depression configured to receive a second portion of the seal, and the seal is arranged in the depressions of the first head unit and the tube. The first head unit generally may have any shape that is capable of accommodating the apertures and contacting a tube.

As used herein, the term "seal", the phrase "first seal", the phrase "second seal", and the like refer to a closure between two objects that eliminates or reduces the likelihood of fluid leakage between the two objects. A "seal" may include (i) contact between the two objects (e.g., two objects that are welded, brazed, fastened, clamped, adhered together with an adhesive, etc.), (ii) a device arranged between and in contact with both of the two objects, or (iii) a combination thereof. The device arranged between and in contact with both of the two objects may include, for example, a rubber seal (e.g., a VITON® rubber seal), a metal seal (e.g., a PARKER HANNIFIN® metal seal), a gasket, etc.

A head unit may define one or more apertures configured to provide fluid to an inlet of a tube, or permit a fluid exiting an outlet of a tube to exit the head unit. The one or more apertures may include one or more channels. A head unit may define one or more apertures in which a fastener for securing a clamp or other device is slidably arranged.

In some embodiments, a tube may include a cap, and the cap may be welded to, clamped to, or include a head unit (e.g., a cap and a head unit are integral parts of a single object). A seal, therefore, may not be included.

In some embodiments, the apparatus also includes a second head unit that defines a first aperture, a first fastener having a first end and a second end, wherein the first fastener is slidably arranged in the first aperture, and the second end of the first fastener is fixably mounted to the applicator, and a first elastically compressible apparatus arranged between the second head unit and the first end and/or second end of the first fastener.

In some embodiments, the apparatus also includes a second head unit that defines a first aperture and a second aperture, a first fastener having a first end and a second end, wherein the first fastener is slidably arranged in the first aperture, and the second end of the first fastener is fixably mounted to the applicator, a second fastener having a first end and a second end, wherein the second fastener is slidably arranged in the second aperture, and the second end of the first fastener is fixably mounted to the applicator, a first elastically compressible apparatus arranged between the second head unit and the first end and/or second end of the first fastener, and a second elastically compressible apparatus arranged between the second head unit and the first end and/or second end of the second fastener, wherein the second end of the tube and second head unit contact each other. In some embodiments, the apparatus includes a third aperture defined by the second head unit, a third fastener having a first end and a second end, wherein the third fastener is slidably arranged in the third aperture, and the second end of the third fastener is fixably mounted to the applicator, and a third elastically compressible apparatus arranged between the second head unit and the first end and/or second end of the third fastener. In some embodiments, the apparatus includes a fourth aperture defined by the second head unit, a fourth fastener having a first end and a second end, wherein the fourth fastener is slidably arranged in the fourth aperture, and the second end of the fourth fastener is fixably mounted to the applicator, and a fourth elastically compressible apparatus arranged between the second head unit and the first end and/or second end of the fourth fastener. The first, second, third, and fourth elastically compressible apparatus may be the same or different as those selected for a first head unit. In some embodiments, the first, second, third, or fourth elastically compressible apparatus includes one or more disc springs slidably mounted on the first fastener, the second fastener, the third fastener, or the fourth fastener, respectively, of the second head unit. In some embodiments, the apparatus includes 1 to 1,000, 1 to 750, 1 to 500, 1 to 250, 1 to 100, 1 to 50, 1 to 25, or 2 to 24 disc springs slidably mounted on the first fastener, the second fastener, the third fastener, or the fourth fastener, respectively, of the second head unit.

A second head unit may contact a portion of a tube, such as a second end of a tube. The second head unit may include a second seal, wherein a portion of a tube, such as a second end (e.g., second cap) of a tube, contacts the second seal. The second seal may include any known seal, and may be selected to prevent or eliminate the likelihood of fluid leakage, and/or withstand one or more parameters of the methods herein, such as pressure. In some embodiments, the second seal includes rubber. For example, the second seal may include a rubber ring, which may be substantially circular when the portion of the tube, such as a second end (e.g., second cap), that contacts the second head unit is substantially cylindrical. In some embodiments, the second seal includes metal, such as a metal ring. In some embodiments, a second head unit includes a depression configured to receive a portion of a tube, such as a second end of the tube (e.g., second cap). The second seal, when present, may be arranged in the depression. In some embodiments, the second head unit includes a depression configured to receive at least a portion of a seal, and a seal is arranged in the depression of the second head unit. In some embodiments, the tube (e.g., a cap) includes a depression configured to receive at least a portion of a seal, and the seal is arranged in the depression of the tube. In some embodiments, the second head unit includes a depression configured to receive a first portion of a seal, and a tube (e.g., a cap) includes a depression configured to receive a second portion of the seal, and the seal is arranged in the depressions of the second head unit and the tube. The second head unit generally may have any shape that is capable of accommodating the apertures and contacting a tube. The second head unit generally may have any shape that is capable of accommodating the apertures and contacting a tube.

In some embodiments, the apparatus includes a head unit that is fixably mounted to the applicator. In some embodiments, the apparatus includes a first head unit and a second head unit, and one or both of the first head unit and the second head unit is fixably mounted to the applicator.

In some embodiments, a head unit is fixably mounted to a tube. For example, (i) a first head unit may be fixably mounted to a first end of the tube, (ii) a second head unit may be fixably mounted to a second end of the tube, or (iii) the first head unit may be fixably mounted to first end of the tube and the second head unit may be fixably mounted to the second end of the tube. A head unit may be fixably mounted to a tube by welding at least a portion of a head unit to at least a portion of a tube. When a tube, for example, includes a metal cap (e.g., a KOVAR® alloy metal cap), the metal cap may be welded to a head unit. In some embodiments, (i) a first head unit is welded to a first end of the tube, (ii) a second head unit is welded to a second end of the tube, or (iii) the first head unit is welded to the first end of the tube and the second head unit is welded to the second end of the tube.

An applicator generally may be made of any material, including a material that is capable of retaining microwaves. In some embodiments, the applicator is formed of a metal, such as stainless steel.

An applicator may have outer walls and/or internal walls (e.g., those dividing chambers of a vessel) of any thickness. In some embodiments, the outer walls and/or internal walls have a thickness of about 0.0002 m to about 0.05 m, about 0.0005 m to about 0.05 m, about 0.001 m to about 0.04 m, about 0.002 m to about 0.03 m, about 0.002 m to about 0.02 m, about 0.002 m to about 0.01 m, about 0.002 m to about 0.05 m, about 0.002 m to about 0.005 m, about 0.003 m to about 0.004 m, or about 0.003 m to about 0.0032 m. A vessel and the chamber(s) of a vessel generally may have any dimensions. If a vessel includes two or more chambers, then each of the chambers may have the same dimensions or different dimensions. A chamber of a vessel or modular unit may be a polygonal chamber (e.g., a cross-sectional shape that is square, rectangular, triangular, etc.) or a non-polygonal chamber (e.g., a cross-sectional shape that is circular, elliptical, etc.). A vessel and/or chamber in a vessel or modular unit may be configured (e.g., dimensioned) as a multimode chamber or a single mode chamber. A vessel and/or chamber in a vessel or modular unit may be configured (e.g., dimensioned) so that at least a portion of the electromagnetic waves, such as a plurality of microwaves, is directed to a tube or a susceptor material in a tube, which may improve heating efficiency.

In some embodiments, the applicators may include one or more sensors. The one or more sensors may include a temperature sensor, such as an infrared temperature sensor. A temperature sensor may be used to monitor or determine a temperature of a tube, such as the external temperature of a tube. One or more chambers of an applicator may include a temperature sensor, which may permit a temperature gradient along a tube to be determined and/or monitored. As a fluid passing through a tube is heated, the temperature of the tube may increase from its first end to its second end. By monitoring or determining this gradient, adjustments may be made to control the temperature gradient in any desirable manner. The one or more sensors may include a distance-detecting sensor. The one or more sensors may be in communication with a controller that adjusts one or more parameters of a component, such as a microwave generator, of an apparatus or system in response to data collected by the one or more sensors. For example, a controller may adjust one or more parameters (e.g., power, frequency, etc.) of a microwave generator in response to data collected from one or more sensors, such as a temperature sensor.

Susceptor Material

As used herein, the phrase "susceptor material" refers to a material that converts electromagnetic energy, such as microwaves, to heat. A susceptor material may include a metal, a half metal, a dielectric, or a combination thereof. A susceptor material may include a metal oxide, such as an iron oxide. In some embodiments, the susceptor material includes silicon carbide. In some embodiments, the susceptor material includes silicon carbide, magnetite, zeolite, quartz, ferrite, carbon black, graphite, granite, or a combination thereof. In some embodiments, the susceptor material includes magnetite. In some embodiments, the susceptor material includes magnetite at an amount of at least 25%, at least 50%, at least 75%, or 100%, by weight, based on the weight of the susceptor material. For example, the susceptor material may include (i) magnetite at an amount of at least 25%, at least 50%, at least 75%, by weight, based on the weight of the susceptor material, and (ii) a filler and/or second susceptor material, such as an iron oxide other than magnetite. In some embodiments, the susceptor material includes a metal, a half metal, a dielectric, or a combination thereof at an amount of at least 5%, at least 10%, at least 15%, at least 20%, at least 25%, at least 50%, at least 75%, or 100%, by weight, based on the weight of the susceptor material.

A susceptor material may be in any form. For example, a susceptor material may be in a particulate form, a monolithic form, or a combination thereof. When the susceptor particles are in a particulate form, the particles may or may not be physically bound to one another. A susceptor material may include a sintered material, such as a plurality of sintered particles of a susceptor material. A susceptor material may include a porous material, such as porous particles of a susceptor material and/or a porous monolith of a susceptor material. In some embodiments, a susceptor material is in a form that permits a fluid to be disposed in and/or traverse a tube. In some embodiments, a susceptor material is in a form that permits a fluid or other material outside of the tube to be heated. For example, a fluid or material, such as a textile, may contact an outer surface of a tube, thereby heating the fluid or material.

When a susceptor material is in a particulate form, the particles may have a substantially uniform size, or a non-uniform size; and the particles may be of any regular or irregular shape (e.g., spheres, plugs, shavings, needles, etc.). When in a particulate form, the susceptor material may have an average largest dimension of about 1 nm to about 10 mm, about 5 nm to about 10 mm, about 10 nm to about 10 mm, about 50 nm to about 10 mm, about 100 nm to about 10 mm, about 500 nm to about 10 mm about 1 µm to about 10 mm, about 25 µm to about 10 mm, about 75 µm to about 10 mm, about 0.1 mm to about 10 mm, about 0.5 mm to about 10 mm, about 0.5 mm to about 8 mm, about 0.5 mm to about 7 mm, about 0.1 mm to about 5 mm, about 0.5 mm to about 5 mm, about 0.5 mm to about 4 mm, about 0.5 mm to about 3 mm, or about 0.5 mm to about 2 mm. In some embodiments, the susceptor material is in a particulate form, and the susceptor material has an average largest dimension of about 1 nm to about 50 nm, about 3 nm to about 40 nm, or about 3 nm to about 35 nm. For example, the susceptor material may include $Fe_3O_4$ nanoparticles having an average diameter of about 3 nm to about 32 nm. The susceptor material may include nanoparticles synthesized by any known technique, such as a seed-less thermolysis technique (see, e.g., Mohapatra, J. et al. *Phys. Chem. Chem. Phys.*, 2018, 20, 12879-12887). When the particles of a susceptor material are substantially spherical or spherical, the average largest dimension is the average largest diameter. Not wishing to be bound by any particular theory, it is believed that the selection of a size of the particles of a susceptor material may alter one or more characteristics of the methods herein, such as heating efficiency, pressure drop, etc., and, therefore, the particle size may be selected accordingly.

An internal reservoir of a tube may contain any amount of a susceptor material. In some embodiments, a susceptor material is present in an internal reservoir of a tube (or an available portion of the internal reservoir tube when one or more retention devices are present and, therefore, define the available portion) at an amount of about 30% to about 100%, about 50% to about 100%, about 70% to about 100%, about 90% to about 100%, or about 100% by volume of the internal reservoir or available portion thereof.

In some embodiments, an internal reservoir of a tube contains an amount of a susceptor material that permits a fluid to be disposed in the tube. In some embodiments, a susceptor material is present in an internal reservoir of a tube (or an available portion of the internal reservoir tube when one or more retention devices are present and, therefore, define the available portion) at an amount of about 30% to about 90% by volume of the internal reservoir or available portion thereof, about 30% to about 80% by volume of the internal reservoir or available portion thereof, about 30% to about 70% by volume of the internal reservoir or available portion thereof, about 40% to about 60% by volume of the internal reservoir or available portion thereof, or about 50% by volume of the internal reservoir or available portion thereof.

When a susceptor material is in a monolithic form, the monolith of susceptor material generally may have any size or shape that permits (i) its disposal in a tube or housing within a tube, (ii) a fluid to traverse the tube, or (iii) a combination thereof. In some embodiments, a monolith of a susceptor material includes one or more elongated monoliths having a length:width ratio of at least 3:1 (e.g., cylindrical in shape), thereby forming a "tube-within-a-tube" configuration in which a fluid may traverse an area defined at least in part by an outer surface of the elongated monolith and an inner surface of the tube. In some embodiments, two or more of the elongated monoliths are arranged, in any manner, in a tube. In some embodiments, the monolith of susceptor material has a size or shape that corresponds to the dimensions of an internal reservoir of a tube or available portion thereof, which may be desirable when a tube is configured to heat a fluid or material outside of a tube (e.g., a fluid or material contacting an outer surface of a tube). In some embodiments, the one or more monoliths include one or more capsule-shaped monoliths having a length:width ratio of less than 3:1 (e.g., spherical, rectangular, square, or elliptical in shape) arranged, in any manner, in a tube. When two or more monoliths are present in a tube, the two or more monoliths may be arranged in a tube in any regular or irregular pattern.

A susceptor material may include one or more additives. The one or more additives may include any material, such as a filler, that is (i) disposed in a tube with the susceptor material (e.g., dispersed evenly or unevenly in the susceptor material), and (ii) incapable of converting a plurality of microwaves to heat. A filler may be included for any reason, such as to ease the handling of a susceptor material, reduce resistance to fluid flow in a tube, achieve a different dispersion of a susceptor material in a tube, etc. A filler may be used to achieve a concentration gradient of a susceptor material within a tube. For example, a filler may permit a fluid disposed in a tube to encounter a concentration or amount of a susceptor material that increases (or decreases) continually or intermittently as the fluid traverses the tube. The one or more additives may be present in a susceptor material at a total amount that does not exceed 50%, by weight, based on the weight of the susceptor material. In other words, if a susceptor material including two additives has a mass of 100 g, then the sum of the masses of the two additives would not exceed 50 g. In some embodiments, one or more additives are present in a susceptor material at an amount of about 0.001% to 10%, by weight, based on the weight of the susceptor material.

Microwave Generators

Any known microwave generators may be included the apparatuses or used in the methods described herein. When an apparatus includes two or more microwave generators, the two or more microwave generators may be the same or different. When an apparatus includes two or more microwave generators, the two or more microwave generators may be operated at the same or different parameters (e.g., power, frequency, wavelength, etc.) during the methods described herein.

The one or more microwave generators may include magnetron continuous wave (CW) or pulse microwave generators, solid state fixed frequency or variable frequency microwave generators, or a combination thereof. The one or more microwave generators generally may be of any power (e.g., 200 W to 100 kW) and/or operate at any frequency (e.g., 915 MHz to 28 GHz) and/or wavelength (1 mm to 1 m). The one or more microwave generators may include commercially available microwave generators, such as SAIREM® microwave generators (Décines-Charpiue, France). The one or more microwave generators may include one or more microwave generators selected from the following table:

| Embodiment No. | Type | Frequency | Power |
|---|---|---|---|
| 1 | Magnetron CW or Pulse | 2.45 GHz | 2 kW |
| 2 | Magnetron CW or Pulse | 2.45 GHz | 3 kW |
| 3 | Magnetron CW or Pulse | 2.45 GHz | 6 kW |
| 4 | Solid State Fixed or Variable Freq. | 2.45 GHz | 200 W |
| 5 | Solid State Fixed or Variable Freq. | 2.45 GHz | 450 W |
| 6 | Magnetron CW or Pulse | 915 MHz | 18 kW |
| 7 | Magnetron CW or Pulse | 915 MHz | 36 kW |
| 8 | Magnetron CW or Pulse | 915 MHz | 54 kW |
| 9 | Magnetron CW or Pulse | 915 MHz | 72 kW |
| 10 | Magnetron CW or Pulse | 915 MHz | 75 kW |
| 11 | Magnetron CW or Pulse | 915 MHz | 100 kW |
| 12 | Solid State Fixed or Variable Freq. | 915 MHz | 600 W |

In some embodiments, the one or more microwave generators include one to ten microwave generators independently selected from Embodiments 1 to 12 of the foregoing table.

Carbonaceous Material Feeder

The systems herein may include a carbonaceous material feeder. The carbonaceous material feeder may be configured to provide a carbonaceous material into a component of a system, such as a reactor. The carbonaceous feeder may be configured to provide a carbonaceous material into a component of a system, such as a reactor, using any force. The force may include gravity.

In some embodiments, the carbonaceous material feeder includes a hopper. In some embodiments, the carbonaceous material feeder includes a hopper and a lock hopper. The lock hopper typically is arranged between a hopper and a reactor. A lock hopper may be in fluid communication with the hopper, the reactor, or both the hopper and the reactor.

At least one component of a carbonaceous material feeder may be in fluid communication with a process gas feeder. For example, a process gas feeder may be in fluid communication with a lock hopper of a carbonaceous material feeder.

Figure 8:
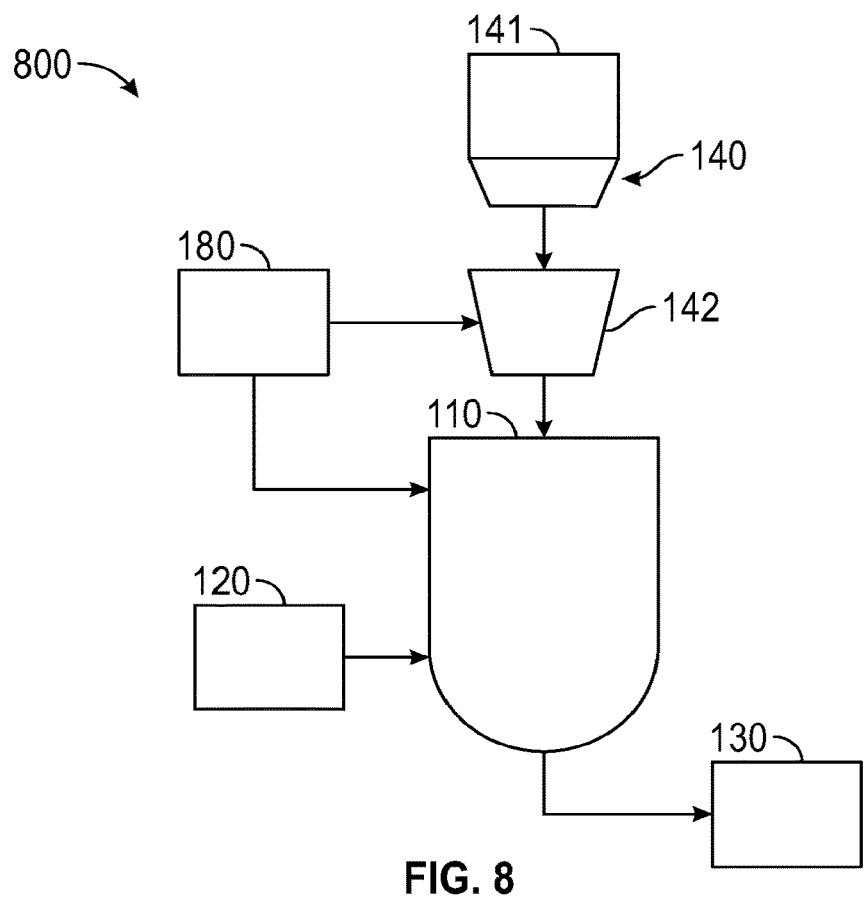
FIG. 8 is a schematic of an embodiment of a system described herein, which includes an embodiment of a carbonaceous material feeder that includes a hopper and a lock hopper.

In some embodiments, the systems 100, 200, 201, 202, 203, 300, 400, 500, 501, 600, 700 of FIG. 1, FIG. 2A, FIG. 2B, FIG. 2C, FIG. 2D, FIG. 3, FIG. 4, FIG. 5A, FIG. 5B, FIG. 6, and FIG. 7, respectively, also include a carbonaceous material feeder 140, as depicted at FIG. 8. FIG. 8 depicts an embodiment of a system 800 including the components of FIG. 5B and a carbonaceous material feeder 140 that includes a hopper 141 and a lock hopper 142. The lock hopper 142 is in fluid communication with the first process gas feeder 180, but other configurations are envisioned. The hopper 141 and lock hopper 142 may be in fluid communication with each other. The lock hopper 142 and the reactor 110 may be in fluid communication with each other. Although the system 800 of FIG. 7 includes the components of the system 501 of FIG. 5B, the carbonaceous material feeder 140 of FIG. 8 may be included in any of the systems 100, 200, 201, 202, 203, 300, 400, 500, 600 depicted at FIG. 1, FIG. 2A, FIG. 2B, FIG. 2C, FIG. 2D, FIG. 3, FIG. 4, FIG. 5A, FIG. 6, and FIG. 7, respectively.

A carbonaceous material feeder may include a heater. The heater may be used to heat a carbonaceous material disposed in at least a portion of a carbonaceous material feeder prior to the disposing of the carbonaceous material in a reactor or other component of a system.

When a carbonaceous material is a component of a paste or slurry, a carbonaceous material feeder may include an apparatus configured for transporting a paste or slurry. A carbonaceous material feeder, for example, may include a pump (e.g., a slurry pump) in fluid communication with a reactor and a reservoir in which a slurry containing a solid carbonaceous material is disposed.

Valves

The systems described herein may include one or more valves. The one or more valves may be used to control movement of fluids and/or carbonaceous materials among the components of a system. A valve or combination of valves may be opened/closed during the processes described herein.

In some embodiments, the systems described herein include a valve arranged between the first process gas feeder and the reactor; a valve arranged between the hydrogen donor feeder and the reactor; a valve arranged between the condenser and the reactor; a valve arranged between the product liquid collection reservoir and the reactor; a valve arranged between the first process gas feeder and the carbonaceous material feeder; a valve arranged between the second process gas feeder and the product liquid collection reservoir; a valve arranged between and in fluid communication with a first opening of the reactor and the pump of the circulation conduit; a valve arranged between and in fluid communication with a second opening of the reactor and the pump; or a combination thereof.

Although portions of this disclosure refer to various valves as a "first valve", "second valve", "third valve", etc., the terms "first", "second", "third", etc. are used only for convenience, and do not indicate that a lower numbered valve (e.g., "third") must be present in a system if the system includes a valve characterized herein as higher numbered valve (e.g., "fourth" or "sixth").

The one or more valves of a system may independently include any type of valve (e.g., gate valve, globe valves, angle valves, ball valves, plug valves, diaphragm valves, etc.), and serve any purpose (e.g., a circulation valve, a drain valve, etc.).

For example, a system may include a valve arranged between a first opening of a reactor and a pump of a circulation conduit, and the valve is a circulation valve. As a further example, a system may also include a valve arranged between a second opening of the reactor and the pump of the circulation conduit, and the valve is a drain valve. As a still further example, a system may also include a valve arranged between a second opening of the reactor and the product liquid collection reservoir, and the valve is a drain valve.

Figure 9:
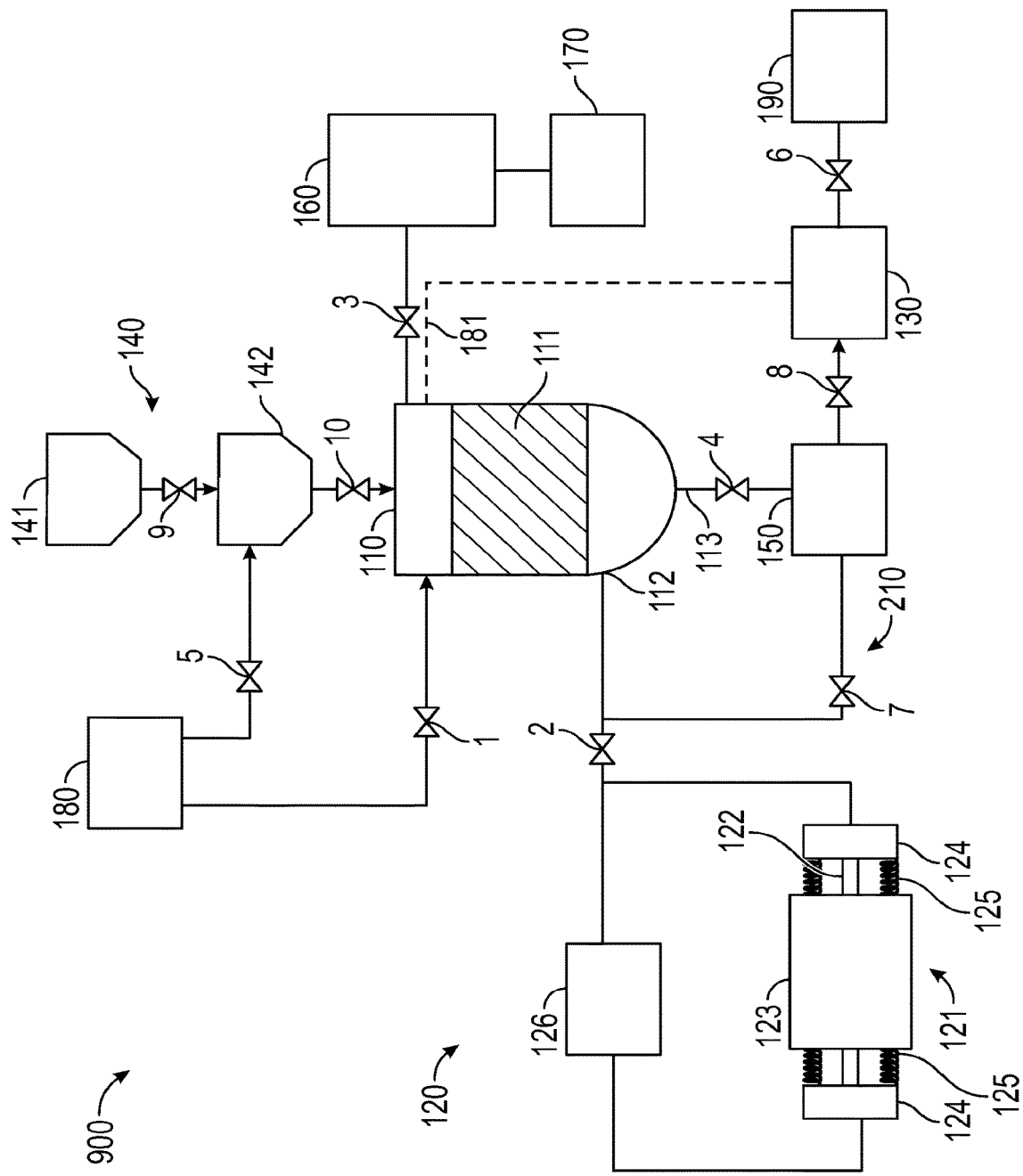
FIG. 9 is a schematic of an embodiment of a system described herein.

When a system includes a circulation conduit, a valve arranged between a hydrogen donor feeder and a reactor may be arranged, more specifically, between the hydrogen donor feeder and the circulation conduit, as depicted, for example, at FIG. 9; and a valve arranged between a reactor and a product liquid collection reservoir may be arranged, more specifically, between the reactor and the circulation conduit, as depicted, for example, at FIG. 9.

One embodiment of a system is depicted at FIG. 9. The system 900 of FIG. 9 includes a reactor 110 and a reactor heater 111 that least partially contacts the reactor 110. The system 900 of FIG. 9 also includes a carbonaceous material feeder 140. The carbonaceous material feeder 140 of the system 900 of FIG. 9 includes a hopper 141 and a lock hopper 142. The lock hopper 142 is in fluid communication with the hopper 141, the reactor 110, and a first process gas feeder 180, and the first process gas feeder 180 also is in fluid communication with the reactor 110. The system 900 of FIG. 9 also includes a condenser 160 in fluid communication with the reactor 110, and a product condensate collection reservoir 170 in fluid communication with the condenser 160. The system 900 of FIG. 9 also includes a circulation conduit 210. The circulation conduit 210 includes a pump 150 in fluid communication with the reactor 110. The system 900 of FIG. 9 also includes a hydrogen donor feeder 120 that includes an apparatus 121. The apparatus 121 includes a tube 122 formed at least in part of an electromagnetic wave-transparent material, and an applicator 123. A susceptor material may be disposed in the tube 122. Although both ends of the tube 122 of FIG. 9 are spring-mounted to the applicator 123 via two head units 124 and disc springs 125, other configurations are envisioned, including those described herein. The system 900 of FIG. 9 also includes a heat exchanger 126 that is in fluid communication with the apparatus 121. A hydrogen donor may be heated by the apparatus 121 and all or a portion of the heated hydrogen donor may be provided to the reactor 110, cooled via the heat exchanger 126 and returned to the apparatus 121, or a combination thereof. The system 900 of FIG. 9 also includes a product liquid collection reservoir 130 in fluid communication with the reactor 110 and the circulation conduit 210, and an optional second process gas feeder 190 in fluid communication with the product liquid collection reservoir 130. When the second process gas feeder 190 is not present, the process gas from the first process gas feeder 180 may be provided from the reactor 110 to the product liquid collection reservoir 130 by the optional line 181 depicted at FIG. 9. The system 900 of FIG. 9 also includes a first valve 1 arranged between the first process gas feeder 180 and the reactor 110; a second valve 2 arranged between the hydrogen donor feeder 120 and the reactor 110, and, more specifically, the hydrogen donor feeder 120 and the circulation conduit 210; a third valve 3 arranged between the condenser 160 and the reactor 110; a fourth valve 4 arranged between a second opening 113 of the reactor 110 and the product liquid collection reservoir 130, and, more specifically, the reactor 110 and the pump 150 of the circulation conduit 210.

The system 900 of FIG. 9 also includes a fifth valve 5 arranged between the first process gas feeder 180 and the carbonaceous material feeder 140, more specifically, the lock hopper 142 of the carbonaceous material feeder 140.

The system 900 of FIG. 9 also includes a sixth valve 6 arranged between the optional second process gas feeder 190 and the product liquid collection reservoir 130.

The system 900 of FIG. 9 also includes a seventh valve 7 arranged between a first opening 112 of the reactor 110 and the pump 150 of the circulation conduit 210.

The system 900 of FIG. 9 also includes an eighth valve arranged between the product liquid collection reservoir 130 and the reactor 110, and, more specifically, between the product liquid collection reservoir 130 and the circulation conduit 210.

The system 900 of FIG. 9 also includes an eighth valve 8 arranged between the product liquid collection reservoir 130 and the reactor 110, and, more specifically, between the product liquid collection reservoir 130 and the circulation conduit 210.

The system 900 of FIG. 9 is depicted as including the first, second, third, fourth, fifth, sixth, seventh, eighth, ninth, and tenth valves, but any combination of these valves may appear in the system 900 of FIG. 9 or the systems 100, 200, 201, 202, 203, 300, 400, 500, 600, 700, 800 depicted at FIG. 1, FIG. 2A, FIG. 2B, FIG. 2C, FIG. 2D, FIG. 3, FIG. 4, FIG. 5A, FIG. 6, FIG. 7, and FIG. 8, respectively.

Methods

Provided herein are methods of liquefaction. The methods generally may be performed with any equipment, and, in some embodiments, the methods are performed with a system as described herein. The methods provided herein may include a batch liquefaction process, or a continuous liquefaction process.

In some embodiments, the methods include providing a hydrogen donor; and contacting a solid carbonaceous material and the hydrogen donor to convert at least a portion of the solid carbonaceous material to a product, such as a fluid product. The fluid product may include a gas, a liquid, or a combination thereof. The hydrogen donor may be provided at any temperature; for example, the hydrogen donor may have a temperature of at least 100° C., at least 200° C., or at least 300° C. The contacting of the solid carbonaceous material and the hydrogen donor may occur at any pressure. The pressure may be atmospheric pressure (e.g., about 0 psig), or any pressure greater than atmospheric pressure. In some embodiments, the contacting of the solid carbonaceous material and the hydrogen donor occurs at a pressure equal to or greater than the critical pressure of the hydrogen donor. In some embodiments, the contacting of the solid carbonaceous material and the hydrogen donor occurs at a pressure ranging from about 10 psi less than the critical pressure of the hydrogen donor to the critical pressure of the hydrogen donor.

In some embodiments, the methods include providing a hydrogen donor; and contacting a solid carbonaceous material and the hydrogen donor at a pressure equal to or greater than the critical pressure of the hydrogen donor to convert at least a portion of the solid carbonaceous material to a product. The hydrogen donor may have a temperature of at least 300° C.

The hydrogen donor generally may be provided at any temperature effective to produce a desirable product from the solid carbonaceous material and the hydrogen donor. In some embodiments, the hydrogen donor has a temperature of about 300° C. to about 600° C., about 350° C. to about 600° C., about 400° C. to about 600° C., 425° C. to about 575° C., 450° C. to about 550° C., or 475° C. to about 525° C.

The pressure equal to or greater than the critical pressure may depend on the hydrogen donor used in a process. In some embodiments, the pressure equal to or greater than the critical pressure is about 550 psig to about 750 psig (about 3.8 MPa to about 5.17 MPa), or about 650 psig to about 700 psig (about 4.48 MPa to about 4.83 MPa).

The providing of the hydrogen donor may include heating the hydrogen donor, such as to a temperature of at least 100° C., at least 200° C., at least 300° C., or at least 400° C.

The heating of the hydrogen donor may be achieved using any known technique. For example, a hydrogen donor may be heated, at least in part, by using any of the methods, systems, or apparatuses described in U.S. patent application Ser. No. 17/167,275 (published under U.S. Patent Application Publication No. 2021/0243857) and PCT International Application No. PCT/US21/16524 (published under WO 2021/158729), which are incorporated herein by reference. In some embodiments, the providing of the hydrogen donor includes (a) irradiating a susceptor material, such as susceptor particles, with electromagnetic energy to provide a heated susceptor material, such as heated susceptor particles; and (b) contacting the hydrogen donor with the heated susceptor particles to heat the hydrogen donor, such as to a temperature of at least 300° C. The electromagnetic energy may include microwave energy. Prior to contacting the hydrogen donor with the heated susceptor particles, the hydrogen donor may be pre-heated (for example, to a temperature of at least 200° C.) using any known technique.

The providing of a hydrogen donor may include passing a hydrogen donor through a tube containing a susceptor material irradiated with electromagnetic waves. A hydrogen donor, or a portion thereof, may be passed through a tube of a heating apparatus one or more times until a desired temperature is reached.

In some embodiments, the methods include contacting a hydrogen donor with a heated susceptor material, such as susceptor particles, to thereby heat the hydrogen donor at a rate of at least 100° C./min, at least 200° C./min, at least 300° C./min, at least 400° C./min, or at least 500° C./min. The methods may include a batch process or a continuous process. In some embodiments, step (b) includes flowing the hydrogen donor through a volume of the heated susceptor particles. In some embodiments, steps (a) and (b) are carried out in a common container (e.g., tube) that receives the susceptor particles and the hydrogen donor.

In some embodiments, the methods include providing a heating apparatus as described herein; disposing a hydrogen donor in the inlet of the container (e.g., tube) at a flow rate; introducing a plurality of electromagnetic waves into the applicator to irradiate at least a portion of the susceptor material with the plurality of electromagnetic waves to generate heat while the hydrogen donor is in the tube to produce a heated hydrogen donor; and collecting the heated hydrogen donor at the outlet of the tube. In some embodiments, the methods also include (i) disposing at least a portion of the heated hydrogen donor in the inlet of the tube; (ii) introducing the plurality of electromagnetic waves into the applicator to irradiate at least a portion of the susceptor material with the plurality of electromagnetic waves to generate heat while the heated hydrogen donor is in the tube to produce a further heated hydrogen donor; and (iii) collecting the further heated hydrogen donor at the outlet of the tube. Steps (i) to (iii) may be repeated one or more times to produce a further heated hydrogen donor having an increased temperature. In some embodiments, the method also includes reducing a temperature of the heated hydrogen donor at least 5% prior to disposing the heated fluid in the inlet. A temperature may be reduced with a heat exchanger, as described herein.

The steps for providing a hydrogen donor described herein may be performed simultaneously, in a substantially continuous manner, or a combination thereof.

A hydrogen donor may have any desired residence time in a container (e.g., tube). A hydrogen donor may have a residence time of not more than 10 minutes, 8 minutes, 5 minutes, 3 minutes, or 1 minute. In some embodiments, the hydrogen donor has a residence time of 0.1 to 5 minutes. As used herein, the phrase "residence time" refers to (i) the time a hydrogen donor spends in a container (e.g., tube) during one pass of a fluid through the container when the method is continuous, or (ii) the time a hydrogen donor maintains contact with heated susceptor particles.

A hydrogen donor may be disposed in a tube or pass through a volume of susceptor material at any flow rate. A flow rate may be selected based on a number parameters, such as the size of a tube, etc. In some embodiments, the flow rate is about 0.1 liters/minute to about 1,000 liters/minute, about 0.1 liters/minute to about 750 liters/minute, about 0.1 liters/minute to about 500 liters/minute, about 0.1 liters/minute to about 250 liters/minute, about 0.1 liters/minute to about 100 liters/minute, about 0.1 liters/minute to about 50 liters/minute, about 0.1 liters/minute to about 25 liters/minute, about 0.1 liters/minute to about 10 liters/minute, about 0.1 liters/minute to about 5 liters/minute, about 0.2 liters/minute to about 3 liters/minute, about 0.2 liters/minute to about 1.2 liters/minute, about 900 liters/minute to about 1,000 liters/minute, about 800 liters/minute to about 1,000 liters/minute, about 700 liters/minute to about 1,000 liters/minute, about 600 liters/minute to about 1,000 liters/minute, about 500 liters/minute to about 1,000 liters/minute, about 400 liters/minute to about 1,000 liters/minute, about 300 liters/minute to about 1,000 liters/minute, about 250 liters/minute to about 1,000 liters/minute, about 200 liters/minute to about 1,000 liters/minute, about 100 liters/minute to about 1,000 liters/minute, about 75 liters/minute to about 1,000 liters/minute, about 50 liters/minute to about 1,000 liters/minute, about 10 liters/minute to about 1,000 liters/minute. In some embodiments, the flow rate is at least 5 liters/minute, at least 10 liters/minute, at least 15 liters/minute, or at least 20 liters/minute. As used herein, the term "flow rate" refers to the rate at which a hydrogen donor is disposed in the inlet of a tube. As the temperature of a hydrogen donor increases, the viscosity of the hydrogen donor may decrease, thereby increasing the likelihood that the flow rate may increase. An apparatus or method may include one or more features that accommodates this phenomenon and/or counters the tendency of the flow rate to increase. Not wishing to be bound by any particular theory, a mass flow rate of a hydrogen donor may remain constant, even if a volume flow rate changes due to a change in viscosity and/or other reason.

A hydrogen donor may be provided to a container (e.g., tube) by any known equipment. For example, a pump, such as a diaphragm pump or a centrifugal pump, may be used to (i) dispose a hydrogen donor in a tube, (ii) forward a hydrogen donor to a heat exchanger, (iii) forward a hydrogen donor to a reactor, or (iv) a combination thereof. In some embodiments, a pump, such as a positive displacement pump, is used to dispose a hydrogen donor in a tube at a flow rate. In some embodiments, a valve is used to impart a desired flow rate to a hydrogen donor disposed in a tube.

Any pressure may be present inside a container (e.g., tube) during all or a portion of the methods provided herein. In some embodiments, the pressure inside the tube (and optionally one or more components of the systems described herein, such as a reactor) is greater than the critical pressure of the hydrogen donor. In some embodiments, the pressure inside the tube (and optionally one or more components of the systems described herein, such as a reactor) exceeds the critical pressure of the hydrogen donor by at least 1%, at least 5%, at least 10%, at least 25%, or at least 50%. In some embodiments, the pressure inside the container (e.g., tube) (and optionally one or more components of the systems described herein, such as a reactor) exceeds the critical pressure of the hydrogen donor by about 1% to about 50%, about 5% to about 50%, about 10% to about 50%, or about 25% to about 50%. This parameter may eliminate or reduce the likelihood that a hydrogen donor converts to the gas phase. A hydrogen donor may be kept at a pressure above its critical pressure before, during, and after being disposed in a container (e.g., tube). In some embodiments, a hydrogen donor is pressurized (i) prior to being disposed in a container (e.g., tube), (ii) during and/or after its collection at the second end of the container (e.g., tube), or (iii) a combination thereof. Therefore, a heated hydrogen donor or further heated hydrogen donor may be kept at a pressure that exceeds the hydrogen donor's critical pressure after its collection for further use. For example, when a method includes flowing a hydrogen donor through a volume the heated susceptor particles, the flowing of the hydrogen donor through the volume of the heated susceptor particles can be carried out at an elevated pressure to prevent vaporization of the hydrogen donor. In some embodiments, a pressure inside a container (e.g., tube) during all or a portion of the methods provided herein is about 1 bar to about 250 bar, about 1.1 bar to about 250 bar, about 5 bar to about 250 bar, about 5 bar to about 225 bar, about 5 bar to about 200 bar, about 5 bar to about 150 bar, about 5 bar to about 100 bar, or about 10 bar to about 100 bar. In some embodiments, a pressure inside a container (e.g., tube) during all or a portion of the methods provided herein is at least 2 bar, at least 5 bar, at least 10 bar, at least 25 bar, at least 50 bar, at least 100 bar, at least 150 bar, or at least 200 bar.

When disposed in a tube, a hydrogen donor may be at an ambient temperature that is greater than the freezing point of the fluid. In some embodiments, a hydrogen donor has a temperature of about 15° C. to about 35° C. when it is disposed for the first time in a tube. In some embodiments, a hydrogen donor has a temperature of about 20° C. to about 30° C. when it is disposed for the first time in a tube.

In some embodiments, a hydrogen donor is pre-heated to a temperature greater than room temperature before being disposed in a container (e.g., tube). For example, a hydrogen donor may be pre-heated to a temperature of at least 50° C., at least 100° C., at least 150° C., or at least 200° C. prior to being disposed in a container (e.g., tube). The pre-heating of the hydrogen donor may be achieved using any known heat source or technique, including techniques that do not rely on electromagnetic radiation.

In some embodiments, the heated hydrogen donor or the further heated hydrogen donor has a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., or about 400° C. to about 500° C. In some embodiments, the heated hydrogen donor or the further heated hydrogen donor has a temperature of about 100° C. to about 600° C., about 200° C. to about 600° C., about 300° C. to about 600° C., about 400° C. to about 600° C., or about 500° C. to about 600° C. In some embodiments, the heated hydrogen donor or the further heated hydrogen donor has a temperature of about 100° C. to about 700° C., about 200° C. to about 700° C., about 300° C. to about 700° C., about 400° C. to about 700° C., about 500° C. to about 700° C., about 600° C. to about 700° C.

In some embodiments, the methods provided herein heat a hydrogen donor by at least 200° C., at least 250° C., at least 300° C., at least 400° C., or at least 500° C.

In some embodiments, a susceptor material irradiated with electromagnetic radiation, as described herein, has a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., about 400° C. to about 500° C. about 250° C. to about 1,500° C., about 350° C. to about 1,500° C., about 450° C. to about 1,500° C., about 300° C. to about 1,000° C., about 300° C. to about 800° C., or about 300° C. to about 700° C.

In some embodiments, the methods provided herein heat a hydrogen donor predominantly by direct heat exchange with a heated susceptor material. In other words, a majority (>50%) of the heat or temperature increase imparted to a hydrogen donor results from the direct heat exchange with a heat susceptor material. In some embodiments, less than 25 percent, less than 20 percent, less than 15 percent, less than 10 percent, or less than 5 percent of the heating of the hydrogen donor is caused by direct absorption of the electromagnetic energy. The ability of a hydrogen donor to absorb electromagnetic energy directly may decrease as its temperature increases. A temperature increase, for example, may cause a hydrogen donor's dielectric constant to decrease, thereby increasing the percentage of heating achieved by an irradiated susceptor material.

The contacting of the solid carbonaceous material and the hydrogen donor may occur, at least partially, in the presence of a catalyst, liquid, or a combination thereof. The liquid may include a solvent in which at least one of the solid carbonaceous material and hydrogen donor is soluble. The solvent may be an inert solvent.

The contacting of the solid carbonaceous material and the hydrogen donor may include mixing the solid carbonaceous material and the hydrogen donor. The mixing of the solid carbonaceous material and the hydrogen donor may be achieved using any techniques known in the art. In some embodiments, the mixing of the solid carbonaceous material and the hydrogen donor includes (i) stirring the solid carbonaceous material and the hydrogen donor in a reactor; (ii) removing from the reactor and then returning to the reactor at least a portion of the solid carbonaceous material and/or the hydrogen donor; or (iii) a combination thereof. The removing from the reactor and then returning to the reactor at least a portion of the solid carbonaceous material and/or the hydrogen donor may be achieved with a circulation conduit, as described herein. The stirring may be achieved with any of the mixing devices described herein.

The contacting of the solid carbonaceous material and the hydrogen donor may include providing a hydrogen donor solvent, optionally heating the hydrogen donor solvent to a temperature greater than room temperature, dispersing the solid carbonaceous material in the hydrogen donor solvent to form a slurry, and then disposing the slurry into a reactor. The slurry, for example, may be pumped into the reactor by a carbonaceous material feeder, as described herein.

The contacting of the solid carbonaceous material and the hydrogen donor may occur in an inert atmosphere. The inert atmosphere may be provided by any technique known in the art, such as with a process gas feeder, as described herein.

In some embodiments, the methods include pre-heating a reactor to a pre-heat reactor temperature of at least 300° C. prior to the contacting of the solid carbonaceous material and the hydrogen donor in the reactor. The pre-heat reactor temperature may be about 300° C. to about 600° C., about 350° C. to about 600° C., about 400° C. to about 600° C., 425° C. to about 575° C., 450° C. to about 550° C., or 475° C. to about 525° C.

In some embodiments, the methods include heating a solid carbonaceous to a temperature of about 100° C. to about 300° C., about 125° C. to about 275° C., about 150° C. to about 250° C., or about 175° C. to about 275° C. prior to the contacting of the solid carbonaceous material and the hydrogen donor.

The methods described herein may produce a fluid product. The fluid product may include a gas, a liquid, or a combination thereof. In some embodiments, the fluid product includes a product condensate, a product liquid, or a combination thereof.

In some embodiments, the methods of liquefaction provided herein employ a system as described herein. The methods may include providing a system described herein, such as any of the systems depicted at FIG. 1-FIG. 9.

In some embodiments, the methods include heating a reactor with a reactor heater to a pre-heat reactor temperature. The pre-heat reactor temperature may be a temperature of at least 300° C.

In some embodiments, the methods include disposing a process gas, such as an inert gas, in a reactor from a process gas feeder to pressurize the reactor. The reactor may be pressurized to any pressure greater than atmospheric pressure. In some embodiments, the reactor is pressurized to a pressure equal to or greater than the critical pressure of a hydrogen donor.

In some embodiments, the methods include disposing a hydrogen donor in a reactor. The hydrogen donor, as explained herein, may have a temperature of at least 300° C. in the reactor.

In some embodiments, the methods include maintaining in a reactor a pressure greater than atmospheric pressure, such as a pressure equal to or greater than the critical pressure of the hydrogen donor. The maintaining in the reactor the pressure may be achieved by any known technique. In some embodiments, the maintaining of pressure in the reactor, such as a pressure equal to or greater than the critical pressure of the hydrogen donor, includes (i) disposing an additional amount of the process gas, such as an inert gas, in the reactor from a process gas feeder, (ii) permitting a portion of the process gas to evacuate the reactor via a valve or component, such as the condenser, of the system, or (iii) a combination thereof.

In some embodiments, the methods include disposing a carbonaceous material from a carbonaceous material feeder into a reactor to contact the carbonaceous material and the hydrogen donor in the reactor to produce a product. The disposing of the carbonaceous material from the carbonaceous material feeder into the reactor may include (i) disposing the carbonaceous material into the lock hopper from the hopper, (ii) contacting the carbonaceous material in the lock hopper with the process gas, such as an inert gas, from a process gas feeder, and (iii) disposing the carbonaceous material into the reactor from the lock hopper.

The solid carbonaceous material may optionally be heated prior to being disposed in a reactor. In some embodiments, the methods include heating the solid carbonaceous to a temperature of about 100° C. to about 300° C., or about 150° C. to about 250° C. prior to the disposing of the carbonaceous material into the reactor from the carbonaceous material feeder.

During and/or after the disposing of the carbonaceous material from the carbonaceous material feeder into the reactor, the methods may include removing and then returning to the reactor at least a portion of the carbonaceous material and the hydrogen donor via the circulation conduit.

In some embodiments, the methods are performed with a system, such as a system of FIG. 9, that includes (i) a first valve arranged between a first process gas feeder and a reactor; (ii) a second valve arranged between a hydrogen donor feeder and a reactor; (iii) a third valve arranged between a condenser and a reactor; (iv) a fourth valve arranged between a reactor and a circulation conduit (or liquid collection reservoir); and the method includes closing the first valve, the second valve, the third valve, and the fourth valve prior to and/or after the disposing of the carbonaceous material from the carbonaceous material feeder into the reactor. The first valve, the second valve, the third valve, and the fourth may be closed for a time effective to produce the product.

In some embodiments, the methods include collecting a product condensate in a product condensate collection reservoir, collecting a product liquid in the product liquid collection reservoir, or a combination thereof. A process gas, such as an inert gas, may be disposed in the product liquid collection reservoir prior to the collecting of the product liquid in the product liquid collection reservoir. In some embodiments, the methods are performed with a system that includes a valve arranged between a product liquid collection reservoir and a reactor, and, optionally, a valve arranged between a second opening of the reactor and the pump; and the collecting of the product liquid in the product liquid collection reservoir includes opening the fourth valve and the eighth valve.

The methods may include depressurizing the reactor prior to collecting the product condensate and/or the product liquid. The depressurizing of the reactor may be achieved via a valve, such as a valve arranged between a condenser and a reactor. The valve may be opened in a manner effective to achieve a desired rate of depressurization.

Carbonaceous Material

As used herein, the phrase "carbonaceous material" refers to a natural or non-natural material that is composed, in whole or in part, of carbon, such as a hydrocarbon, including substituted hydrocarbons, as defined herein. Carbon may be present in a "carbonaceous material" at an amount of at least 50%, at least 75%, at least 80%, at least 85%, or at least 90%, by weight, based on the weight of the carbonaceous material. As used herein, the phrase "solid carbonaceous material" refers to a carbonaceous material that is a solid at room temperature (i.e., 20° C. to 25° C.) and atmospheric pressure. A "solid carbonaceous material" may have a water content of less than 40%, less than 35%, less than 30%, less than 25%, less than 20%, less than 15%, less than 10%, or less than 5%, by weight.

Non-limiting examples of solid carbonaceous materials may include, or be derived from, coal, coke, resins, carbon blacks, paraffins, olefins, pitch (e.g., coal tar pitch), oil sands, oil shale, black shale, tar, tar sands, bitumens (e.g., gilsonite, glance pitch, etc., which may include natural asphalts, asphaltites, and asphaltoids), kerogens (e.g. torbanite, coorongite, etc.), mineral waxes, etc.

A solid carbonaceous material may be in any physical form. In some embodiments, the solid carbonaceous material is in a particulate form. When the solid carbonaceous material is in a particulate form, the particles may or may not be physically bound to one another. The carbonaceous material may have an average particle size of about 0.1 μm to about 5 mm, about 0.1 μm to about 4 mm, about 0.1 μm to about 3 mm, about 0.1 μm to about 2 mm, about 0.1 μm to about 1 mm, about 0.1 mm to about 1 mm, about 0.2 mm to about 1 mm, about 0.3 mm to about 1 mm, about 0.4 mm to about 1 mm, or about 0.5 mm to about 1 mm. The average particle size may be determined by any known technique, such as sieve analysis or dynamic light scattering.

In some embodiments, the solid carbonaceous material is a component of a slurry (i.e., a flowable suspension of a solid carbonaceous material) or a paste (i.e., a non-flowable mixture of a solid carbonaceous material and a liquid). The slurry or paste may be contacted with a hydrogen donor, as described herein. For example, the slurry or paste may be disposed in a reactor, as described in the methods herein. A slurry or paste may include a solid carbonaceous material and one or more liquids. The one or more liquids of a slurry or paste may include a polar and/or non-polar liquid, and the one or more liquids may include a hydrogen donor liquid, a non-hydrogen donor liquid, or a combination thereof.

In some embodiments, the methods described herein include grinding a solid carbonaceous material prior to the contacting of the solid carbonaceous material and the hydrogen donor. A solid carbonaceous material may be ground using any known technique, such as jet milling. Methods of jet milling that may be used to grind the solid carbonaceous material include those described in International Application No. PCT/US2020/012522 (as published under WO 2020/146337), which is incorporated herein by reference. In some embodiments, the grinding of the solid carbonaceous material includes disposing in a grinding chamber of a jet mill a first stream comprising (i) a circulating fluid and (ii) particles of a carbonaceous material to produce a second stream comprising (a) the circulating fluid and (b) a ground carbonaceous material, wherein the jet mill is pressurized by the circulating fluid; forwarding the second stream to a cyclone separator, wherein the cyclone separator is configured to separate a first portion of the ground carbonaceous material from a second portion of the ground carbonaceous material, wherein the first portion of the ground carbonaceous material includes particles having a particle size equal to or greater than a threshold particle size, and the second portion of the ground carbonaceous material includes particles having a particle size less than the threshold particle size; collecting the first portion of the ground carbonaceous material in a first collector; forwarding to a second collector a third stream comprising (1) the circulating fluid and (2) the second portion of the ground carbonaceous material, wherein the second collector is configured to separate the second portion of the ground carbonaceous material from the third stream to produce a fourth stream comprising the circulating fluid; and contacting the fourth stream with additional particles of the carbonaceous material to produce a fifth stream; wherein the first portion of the ground carbonaceous material comprises the solid carbonaceous material. The circulating fluid may include an oxygen-free gas. In some embodiments, the circulating fluid includes nitrogen gas, carbon dioxide, or a combination thereof.

Hydrogen Donor

As used herein, the phrase "hydrogen donor" refers to (i) hydrogen gas, (ii) a compound capable of being dehydrogenated, thereby transferring hydrogen atoms to a carbonaceous material, or (iii) a combination hereof.

In some embodiments, the hydrogen donor includes a hydrocarbon. The hydrocarbon may be cyclic, e.g., polycyclic, an at least partially hydrogenated derivative of an unsaturated (e.g., an aromatic) compound, or a combination thereof. For example, the hydrocarbon may be an at least partially hydrogenated derivative of a polycyclic aromatic compound. In some embodiments, the hydrocarbon is an at least partially hydrogenated derivative of naphthalene, such as tetralin and/or decalin.

As used herein, the term "hydrocarbon" refers to compounds having structures formed of carbon and hydrogen, and, optionally, one or more substituents if the hydrocarbon is substituted. In some embodiments, the hydrocarbon is a $C_1$-$C_{40}$ hydrocarbon. In some embodiments, the hydrocarbon is a $C_1$-$C_{30}$ hydrocarbon. In some embodiments, the hydrocarbon is a $C_1$-$C_{20}$ hydrocarbon. In some embodiments, the hydrocarbon is a $C_5$-$C_{15}$ hydrocarbon, or a $C_{10}$-$C_{20}$ hydrocarbon. As used herein, the phrases "$C_1$-$C_{40}$ hydrocarbon", "$C_1$-$C_{30}$ hydrocarbon", "$C_1$-$C_{20}$ hydrocarbon", and the like, generally refer to aliphatic hydrocarbons and/or aromatic hydrocarbons containing 1 to 40 carbon atoms, 1 to 30 carbon atoms, or 1 to 20 carbon atoms, respectively. Examples of $C_1$-$C_{40}$ hydrocarbons include, but are not limited to, aliphatic hydrocarbons, cyclic hydrocarbons, aromatic hydrocarbons, and the like, and includes all substituted, unsubstituted, branched, and linear analogs and/or derivatives thereof (e.g., partially or completely hydrogenated derivatives thereof), in each instance having 1 to 40 carbon atoms. Examples of cyclic aliphatic or aromatic hydrocarbons include, but are not limited to, anthracene, azulene, biphenyl, fluorene, indan, indene, phenanthrene, benzene, naphthalene, toluene, xylene, mesitylene, and the like, including all substituted, unsubstituted, hydrogenated (partially or completely), and/or heteroatom-substituted derivatives thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl, cycloalkyl, alkenyl, cycloalkenyl, alkynyl, cycloalkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, arylalkyl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$, $SO_2NR'R''$), sulfone, sulfonyl (including alkylsulfonyl, arylsulfonyl and arylalkylsulfonyl), sulfoxide, thiol (e.g., sulfhydryl, thioether) or urea.

Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, tolyl, xylyl, mesityl, benzyl, and the like, including any heteroatom substituted derivative thereof.

EMBODIMENTS

The following is a non-limiting list of embodiments of the methods and systems described herein:

Embodiment 1. A method of liquefaction, the method comprising providing a hydrogen donor; and contacting a solid carbonaceous material and the hydrogen donor to convert at least a portion of the solid carbonaceous material to a product.

Embodiment 2. The method of Embodiment 1, wherein the product is a fluid product.

Embodiment 3. The method of Embodiment 2, wherein the fluid product comprises a product gas, a product condensate, a product liquid, or a combination thereof.

Embodiment 4. The method of any of the preceding embodiments, wherein the providing of the hydrogen donor comprises (a) irradiating a susceptor material, such as susceptor particles, with electromagnetic energy to provide a heated susceptor material, such as heated susceptor particles; and (b) contacting the hydrogen donor and the heated susceptor material, such as heated susceptor particles, to heat the hydrogen donor to a temperature.

Embodiment 5. The method of embodiment 4, wherein the heated susceptor material, such as the heated susceptor particles, has/have a temperature of about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., about 400° C. to about 500° C. about 250° C. to about 1,500° C., about 350° C. to about 1,500° C., about 450° C. to about 1,500° C., about 300° C. to about 1,000° C., about 300° C. to about 800° C., or about 300° C. to about 700° C.

Embodiment 6. The method of any of the preceding embodiments, wherein (i) the hydrogen donor has a temperature of, or (ii) the temperature of the hydrogen donor is at least 300° C., about 50° C. to about 1,500° C., about 100° C. to about 1,250° C., about 100° C. to about 1,000° C., about 100° C. to about 900° C., about 100° C. to about 800° C., about 100° C. to about 700° C., about 100° C. to about 600° C., about 100° C. to about 500° C., about 200° C. to about 500° C., about 300° C. to about 500° C., or about 400° C. to about 500° C., about 200° C. to about 600° C., about 300° C. to about 600° C., about 400° C. to about 600° C., or about 500° C. to about 600° C., about 200° C. to about 700° C., about 300° C. to about 700° C., about 400° C. to about 700° C., about 500° C. to about 700° C., or about 600° C. to about 700° C.

Embodiment 7. The method of any of embodiments 4 to 6, wherein the contacting of the hydrogen donor and the heated susceptor material heats the hydrogen donor at a rate of at least 100° C./min, at least 200° C./min, at least 300° C./min, at least 400° C./min, or at least 500° C./min.

Embodiment 8. The method of any of embodiments 4 to 7, wherein the electromagnetic energy comprises microwave energy.

Embodiment 9. The method of any of the preceding embodiments, further comprising providing a reactor configured to host the contacting of the solid carbonaceous material and the hydrogen donor; wherein the contacting of the hydrogen donor and the solid carbonaceous material occurs, at least in part, in the reactor.

Embodiment 10. The method of embodiment 9, further comprising pre-heating the reactor to a pre-heat reactor temperature of at least 300° C. prior to the contacting of the solid carbonaceous material and the hydrogen donor in the reactor.

Embodiment 11. The method of embodiment 10, wherein the pre-heat reactor temperature is about 300° C. to about 600° C., about 350° C. to about 600° C., about 400° C. to about 600° C., 425° C. to about 575° C., 450° C. to about 550° C., or 475° C. to about 525° C.

Embodiment 12. The method of any of the preceding embodiments, wherein the contacting of the solid carbonaceous material and the hydrogen donor comprises mixing the solid carbonaceous material and the hydrogen donor.

Embodiment 13. The method of embodiment 12, wherein the mixing of the solid carbonaceous material and the hydrogen donor comprises (i) stirring the solid carbonaceous material and the hydrogen donor in the reactor; (ii) removing from the reactor and then returning to the reactor (a) at least a portion of the solid carbonaceous material, (b) at least a portion of the hydrogen donor, or (c) a combination thereof; or (iii) a combination thereof.

Embodiment 14. The method of any of the preceding embodiments, wherein the contacting of the solid carbonaceous material and the hydrogen donor occurs, at least partially, in the presence of a catalyst, a liquid, or a combination thereof.

Embodiment 15. The method of embodiment 14, wherein the liquid comprises a solvent in which at least one of the solid carbonaceous material and the hydrogen donor is soluble. The solvent may be an inert solvent.

Embodiment 16. The method of any of the preceding embodiments, wherein the contacting of the solid carbonaceous material and the hydrogen donor occurs at a pressure greater than atmospheric pressure.

Embodiment 17. The method of any of the preceding embodiments, wherein the contacting of the solid carbonaceous material and the hydrogen donor occurs at a pressure equal to or greater than the critical pressure of the hydrogen donor, or a pressure from about 10 psi less than the critical pressure of the hydrogen donor to the critical pressure of the hydrogen donor.

Embodiment 18. The method of embodiment 17, wherein the pressure exceeds the critical pressure of the hydrogen donor by at least 1%, at least 5%, at least 10%, at least 25%, or at least 50%.

Embodiment 19. The method of embodiment 17 or 18, wherein the pressure equal to or greater than the critical pressure is about 550 psig to about 750 psig (about 3.8 MPa to about 5.17 MPa), or about 650 psig to about 700 psig (about 4.48 MPa to about 4.83 MPa).

Embodiment 20. The method of any of the preceding embodiments, wherein the contacting of the solid carbonaceous material and the hydrogen donor occurs in an inert atmosphere.

Embodiment 21. The method of any of the preceding embodiments, further comprising heating the solid carbonaceous material to a temperature of about 100° C. to about 300° C., about 125° C. to about 275° C., about 150° C. to about 250° C., or about 175° C. to about 275° C. prior to the contacting of the solid carbonaceous material and the hydrogen donor.

Embodiment 22. The method of any of the preceding embodiments, wherein the solid carbonaceous material is in a particulate form.

Embodiment 23. The method of embodiment 22, wherein the solid carbonaceous material has an average particle size of about 0.1 μm to about 5 mm, about 0.1 μm to about 4 mm, about 0.1 μm to about 3 mm, about 0.1 μm to about 2 mm, about 0.1 μm to about 1 mm, about 0.1 mm to about 1 mm, about 0.2 mm to about 1 mm, about 0.3 mm to about 1 mm, about 0.4 mm to about 1 mm, or about 0.5 mm to about 1 mm.

Embodiment 24. The method of any of the preceding embodiments, wherein carbon is present in the solid carbonaceous material at an amount of at least 50%, at least 75%, at least 80%, at least 85%, or at least 90%, by weight, based on the weight of the solid carbonaceous material.

Embodiment 25. The method of any of the preceding embodiments, wherein the solid carbonaceous material has a water content of less than 40%, less than 35%, less than 30%, less than 25%, less than 20%, less than 15%, less than 10%, or less than 5%, by weight.

Embodiment 26. The method of any of the preceding embodiments, wherein the solid carbonaceous material includes, or is derived from, coal, coke, resins, carbon blacks, paraffins, olefins, pitch (e.g., coal tar pitch), oil sands, oil shale, black shale, tar, a tar sand, a bitumen (e.g., gilsonite, glance pitch, etc., which may include natural asphalts, asphaltites, and asphaltoids), a kerogen (e.g. torbanite, coorongite, etc.), a mineral wax, or a combination thereof.

Embodiment 27. The method of any of the preceding embodiments, further comprising grinding the solid carbonaceous material prior to the contacting of the solid carbonaceous material and the hydrogen donor.

Embodiment 28. The method of embodiment 27, wherein the grinding of the solid carbonaceous material comprises disposing in a grinding chamber of a jet mill a first stream comprising (i) a circulating fluid and (ii) particles of a carbonaceous material to produce a second stream comprising (a) the circulating fluid and (b) a ground carbonaceous material, wherein the jet mill is pressurized by the circulating fluid.

Embodiment 29. The method of embodiment 28, further comprising forwarding the second stream to a cyclone separator, wherein the cyclone separator is configured to separate a first portion of the ground carbonaceous material from a second portion of the ground carbonaceous material, wherein the first portion of the ground carbonaceous material includes particles having a particle size equal to or greater than a threshold particle size, and the second portion of the ground carbonaceous material includes particles having a particle size less than the threshold particle size; collecting the first portion of the ground carbonaceous material in a first collector; forwarding to a second collector a third stream comprising (1) the circulating fluid and (2) the second portion of the ground carbonaceous material, wherein the second collector is configured to separate the second portion of the ground carbonaceous material from the third stream to produce a fourth stream comprising the circulating fluid; and contacting the fourth stream with additional particles of the carbonaceous material to produce a fifth stream; wherein the first portion of the ground carbonaceous material comprises the solid carbonaceous material.

Embodiment 30. The method of embodiment 28 or 29, wherein the circulating fluid comprises nitrogen gas, carbon dioxide, or a combination thereof.

Embodiment 31. The method of any of the preceding embodiments, wherein the hydrogen donor comprises a hydrocarbon.

Embodiment 32. The method of embodiment 31, wherein the hydrocarbon is a $C_1$-$C_{40}$ hydrocarbon, a $C_1$-$C_{30}$ hydrocarbon, a $C_1$-$C_{20}$ hydrocarbon, $C_5$-$C_{15}$ hydrocarbon, or a $C_{10}$-$C_{20}$ hydrocarbon.

Embodiment 33. The method of embodiment 31 or 32, wherein the hydrocarbon is cyclic (e.g., polycyclic), an at least partially hydrogenated derivative of an unsaturated (e.g., an aromatic) compound, or a combination thereof.

Embodiment 34. The method of any of embodiments 31 to 33, wherein the hydrocarbon is an at least partially hydrogenated derivative of a polycyclic aromatic compound.

Embodiment 35. The method of embodiment 34, wherein the hydrocarbon is an at least partially hydrogenated derivative of naphthalene, such as tetralin and/or decalin.

Embodiment 36. The method of any of the preceding embodiments, wherein the hydrogen donor has a temperature of at least 300° C.

Embodiment 37. The method of any of the preceding embodiments, wherein the solid carbonaceous material is a component of a slurry or a paste.

Embodiment 38. A system comprising:

(A) a reactor; a hydrogen donor feeder; and a product liquid collection reservoir; wherein the hydrogen donor feeder and the product liquid collection reservoir are in fluid communication with the reactor, wherein the reactor is configured to receive a carbonaceous material from a carbonaceous material feeder; and wherein the hydrogen donor feeder is configured to provide to the reactor a hydrogen donor; or (B) a reactor, a hydrogen donor feeder, a product liquid collection reservoir, wherein the hydrogen donor feeder and the product liquid collection reservoir are in fluid communication with the reactor, wherein the reactor is configured to receive a carbonaceous material from a carbonaceous material feeder, wherein the hydrogen donor feeder is configured to provide to the reactor a hydrogen donor, a circulation conduit configured to remove from the reactor and then return to the reactor at least a portion of the reactor's contents, optionally a reactor heater, a condenser, and a product condensate collection reservoir, wherein the condenser is in fluid communication with the reactor, and the product condensate collection reservoir is in fluid communication with the condenser, a first process gas feeder, wherein the first process gas feeder is in fluid communication with the reactor, the carbonaceous material feeder, the product liquid collection reservoir, or a combination thereof, a second process gas feeder, wherein the second process gas feeder is in fluid communication with the product liquid collection reservoir, wherein the carbonaceous material feeder comprises a hopper and a lock hopper, wherein the lock hopper is (i) arranged between the hopper and the reactor, and (ii) in fluid communication with a first process gas feeder, the hopper, the reactor, or a combination thereof, wherein the hydrogen donor feeder optionally comprises an apparatus, the apparatus comprising a tube formed at least in part of an electromagnetic wave-transparent material, and an applicator, wherein (i) a first end of the tube is fixably mounted or spring mounted to the applicator, and (ii) at least a portion of the tube is arranged in the applicator, optionally a heat exchanger in fluid communication with the apparatus, and at least one valve selected from the group consisting of (i) a first valve arranged between the first process gas feeder and the reactor, (ii) a second valve arranged between the hydrogen donor feeder and the reactor, (iii) a third valve arranged between the condenser and the reactor, (iv) a fourth valve arranged between the product liquid collection reservoir and the reactor, (v) a fifth valve arranged between the first process gas feeder and the carbonaceous material feeder, (vi) a sixth valve arranged between the second process gas feeder and the product liquid collection reservoir, (vii) a seventh valve arranged between and in fluid communication with a first opening of the reactor and the pump of the circulation conduit, and (viii) an eighth valve arranged between the product liquid collection reservoir and the circulation conduit.

Embodiment 39. The system of embodiment 38, further comprising a circulation conduit configured to remove from the reactor and then return to the reactor at least a portion of the reactor's contents.

Embodiment 40. The system of embodiment 39, wherein the circulation conduit comprises a pump in fluid communication with (i) the reactor, (ii) the reactor and the hydrogen donor feeder, (iii) the reactor and the product liquid collection reservoir, or (iv) the reactor, the hydrogen donor feeder, and the product liquid collection reservoir.

Embodiment 41. The system of embodiment 40, wherein the pump is a positive displacement pump having a cavity volume sufficient to displace, per each cycle, about 2% to about 30%, about 2% to about 20%, about 2% to about 15%, about 2% to about 12%, about 2% to about 10%, about 2% to about 8%, or about 4% to about 8%, or about 6%, by weight, of the reactor's contents.

Embodiment 42. The system of any of embodiments 38 to 41, further comprising a condenser; and a product condensate collection reservoir; wherein the condenser is in fluid communication with the reactor, and the product condensate collection reservoir is in fluid communication with the condenser.

Embodiment 43. The system of any of embodiments 38 to 42, further comprising a reactor heater.

Embodiment 44. The system of embodiment 43, wherein the reactor heater is placed adjacent or in contact with a reactor.

Embodiment 45. The system of embodiment 43 or 44, wherein the reactor heater is a fluid bath in which the reactor is at least partially submerged.

Embodiment 46. The system of any of embodiments 38 to 45, further comprising a first process gas feeder, wherein the first process gas feeder is in fluid communication with the reactor, the carbonaceous material feeder, the product liquid collection reservoir, or a combination thereof.

Embodiment 47. The system of embodiment 46, wherein the first process gas feeder is in fluid communication with the reactor and the carbonaceous material feeder.

Embodiment 48. The system of any of embodiments 38 to 47, further comprising a second process gas feeder, wherein the second process gas feeder is in fluid communication with the product liquid collection reservoir.

Embodiment 49. The system of any of embodiments 38 to 48, wherein the carbonaceous material feeder comprises a hopper.

Embodiment 50. The system of any of embodiments 38 to 49, wherein the carbonaceous material feeder further comprises a lock hopper.

Embodiment 51. The system of embodiment 50, wherein the lock hopper is (i) arranged between the hopper and the reactor, and (ii) in fluid communication with a first process gas feeder, the hopper, the reactor, or a combination thereof.

Embodiment 52. The system of any of embodiments 38 to 51, wherein the carbonaceous material feeder includes an apparatus configured for transporting a paste or slurry, such as a pump (e.g., a slurry pump) in fluid communication with a reactor and a reservoir in which a slurry containing a solid carbonaceous material is disposed.

Embodiment 53. The system of any of embodiments 38 to 52, further comprising a mixing apparatus disposed in the reactor.

Embodiment 54. The system of any of embodiments 38 to 53, wherein the hydrogen donor feeder comprises an apparatus, the apparatus comprising a tube formed at least in part of an electromagnetic wave-transparent material; and an applicator, wherein (i) a first end of the tube is fixably mounted or spring mounted to the applicator, and (ii) at least a portion of the tube is arranged in the applicator.

Embodiment 55. The system of embodiment 54, further comprising a susceptor material disposed in the tube, wherein at least a portion of the susceptor material in the tube is arranged in the applicator.

Embodiment 56. The system of embodiment 55, wherein the susceptor material is in a particulate form.

Embodiment 57. The system of any of embodiments 54 to 56, wherein a second end of the tube is fixably mounted or spring mounted to the applicator.

Embodiment 58. The system of any of embodiments 54 to 57, wherein the first end of the tube is spring mounted to the applicator, the second end of the tube is spring mounted to the applicator, or both the first end of the tube and the second end of the tube are spring mounted to the applicator.

Embodiment 59. The system of any of embodiments 54 to 58, further comprising a heat exchanger in fluid communication with the apparatus.

Embodiment 60. The system of any of embodiments 38 to 59, further comprising (i) a first valve arranged between the first process gas feeder and the reactor; (ii) a second valve arranged between the hydrogen donor feeder and the reactor; (iii) a third valve arranged between the condenser and the reactor; (iv) a fourth valve arranged between the product liquid collection reservoir and the reactor; or any combination thereof.

Embodiment 61. The system of any of embodiments 38 to 60, further comprising (i) a fifth valve arranged between the first process gas feeder and the carbonaceous material feeder, and/or (ii) a sixth valve arranged between the second process gas feeder and the product liquid collection reservoir.

Embodiment 62. The system of any of embodiments 38 to 61, further comprising (i) a seventh valve arranged between and in fluid communication with a first opening of the reactor and the pump of the circulation conduit; and/or (ii) an eighth valve arranged between the product liquid collection reservoir and the circulation conduit.

Embodiment 63. The system of any of embodiments 60 to 62, wherein, when present, each of the first valve, the second valve, the third valve, the fourth valve, the fifth valve, the sixth valve, the seventh valve, and the eighth valve is independently selected from the group consisting of a gate valve, a globe valve, an angle valve, a ball valve, a plug valve, and a diaphragm valve.

Embodiment 64. The system of any of embodiments 60 to 62, wherein the seventh valve is a circulation valve, and the fourth valve is a drain valve.

Embodiment 65. The system of any of embodiments 60 to 64, wherein the second valve is arranged between the hydrogen donor feeder and the circulation conduit.

Embodiment 66. The system of any of embodiments 60 to 65, wherein the fourth valve is arranged between a second opening of the reactor and the pump of the circulation conduit, and the eighth valve is arranged between the pump of the circulation conduit and the product liquid collection reservoir.

Embodiment 67. A method of liquefaction, the method comprising providing the system of any one of embodiments 38 to 66; optionally heating the reactor with the reactor heater to a pre-heat reactor temperature of at least 100° C., at least 200° C., or at least 300° C.; optionally disposing a process gas in the reactor from the first process gas feeder to pressurize the reactor to a pressure greater than atmospheric pressure; disposing the hydrogen donor in the reactor; optionally maintaining in the reactor the pressure greater than atmospheric pressure; disposing a carbonaceous material from the carbonaceous material feeder into the reactor to contact the carbonaceous material and the hydrogen donor in the reactor to convert at least a portion of the carbonaceous material to a product; collecting a product condensate in the product condensate collection reservoir; and collecting a product liquid in the product liquid collection reservoir.

Embodiment 68. The method of embodiment 67, further comprising, prior to the collecting of the product condensate and/or the product liquid, depressurizing the reactor via the third valve arranged between the condenser and the reactor.

Embodiment 69. The method of embodiment 67 or 68, further comprising, during and/or after the disposing of the carbonaceous material from the carbonaceous material feeder into the reactor, removing and then returning to the reactor at least a portion of the carbonaceous material and the hydrogen donor via the circulation conduit.

Embodiment 70. The method of any of embodiments 67 to 69, wherein the maintaining in the reactor the pressure greater than atmospheric pressure comprises (i) disposing an additional amount of the process gas in the reactor from the first process gas feeder, (ii) permitting a portion of the process gas to evacuate the reactor via the condenser, or (iii) a combination thereof.

Embodiment 71. The method of any of embodiments 67 to 70, wherein the disposing of the carbonaceous material from the carbonaceous material feeder into the reactor comprises (i) disposing the carbonaceous material into the lock hopper from the hopper, (ii) contacting the carbonaceous material in the lock hopper with the process gas from the first process gas feeder, and (iii) disposing the carbonaceous material into the reactor from the lock hopper.

Embodiment 72. The method of any of embodiments 67 to 71, further comprising heating the solid carbonaceous to a temperature of about 100° C. to about 300° C. prior to the disposing of the carbonaceous material into the reactor from the carbonaceous material feeder.

Embodiment 73. The method of any of embodiments 67 to 72, further comprising closing the first valve, the second valve, the third valve, and the fourth valve prior to and/or after the disposing of the carbonaceous material from the carbonaceous material feeder into the reactor, wherein the first valve, the second valve, the third valve, and the fourth are closed for a time effective to produce the product.

Embodiment 74. The method of any of embodiments 67 to 73, further comprising disposing the process gas from the second process gas feeder into the product liquid collection reservoir prior to the collecting of the product liquid in the product liquid collection reservoir.

Embodiment 75. The method of any of embodiments 67 to 74, wherein the collecting of the product liquid in the product liquid collection reservoir comprises opening (i) the fourth valve, or (ii) the fourth valve and the eighth valve.

Embodiment 76. The method of any of embodiments 67 to 75, wherein the pressure greater than atmospheric pressure is equal to or greater than the critical pressure of the hydrogen donor provided by the hydrogen donor feeder.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When methods or apparatuses are claimed or described in terms of "comprising" various steps or components, the methods or apparatuses can also "consist essentially of" or "consist of" the various steps or components, unless stated otherwise.

The terms "a," "an," and "the" are intended to include plural alternatives, e.g., at least one. For instance, the disclosure of "a solid carbonaceous material," "a hydrogen donor," "a pump", and the like, is meant to encompass one, or mixtures or combinations of more than one solid carbonaceous material, hydrogen donor, pump, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that a pump may have a cavity volume sufficient to displace, per each cycle, about 2% to about 15%, by weight, or a reactor's contents. This range should be interpreted as encompassing about 2% and about 15%, and further encompasses "about" each of 3%, 4%, 5%, 6%, 7%, 8%, 9%, 10%, 11%, 12%, 13%, and 14%, including any ranges and sub-ranges between any of these values.

As used herein, the term "about" means plus or minus 10% of the numerical value of the number with which it is being used.

The invention claimed is:
1. A method of liquefaction, the method comprising:
providing a hydrogen donor; and
contacting a solid carbonaceous material and the hydrogen donor to convert at least a portion of the solid carbonaceous material to a product;
wherein the providing of the hydrogen donor comprises
(a) irradiating a susceptor material with electromagnetic energy to provide a heated susceptor material, and
(b) contacting the hydrogen donor and the heated susceptor material to heat the hydrogen donor to a temperature of at least 300° C.;

wherein the susceptor material and the heated susceptor material do not contact the solid carbonaceous material, and the susceptor material and the heated susceptor material do not contact the product.

2. The method of claim 1, wherein the electromagnetic energy comprises microwave energy.

3. The method of claim 1, further comprising providing a reactor configured to host the contacting of the solid carbonaceous material and the hydrogen donor.

4. The method of claim 3, wherein the contacting of the solid carbonaceous material and the hydrogen donor comprises mixing the solid carbonaceous material and the hydrogen donor.

5. The method of claim 4, wherein the mixing of the solid carbonaceous material and the hydrogen donor comprises:
 (i) stirring the solid carbonaceous material and the hydrogen donor in the reactor;
 (ii) removing from the reactor and then returning to the reactor (a) at least a portion of the solid carbonaceous material, (b) at least a portion of the hydrogen donor, or (c) a combination thereof; or
 (iii) a combination thereof.

6. The method of claim 1, wherein the contacting of the solid carbonaceous material and the hydrogen donor occurs at a pressure greater than atmospheric pressure.

7. The method of claim 6, wherein the pressure greater than atmospheric pressure is equal to or greater than the critical pressure of the hydrogen donor.

8. The method of claim 1, further comprising heating the solid carbonaceous material to a temperature of about 100° C. to about 300° C. prior to the contacting of the solid carbonaceous material and the hydrogen donor.

9. The method of claim 1, wherein the solid carbonaceous material is in a particulate form, and has an average particle size of about 0.1 µm to about 5 mm.

10. The method of claim 1, further comprising grinding the solid carbonaceous material prior to the contacting of the solid carbonaceous material and the hydrogen donor, wherein the grinding of the solid carbonaceous material comprises:
 disposing in a grinding chamber of a jet mill a first stream comprising (i) a circulating fluid and (ii) particles of a carbonaceous material to produce a second stream comprising (a) the circulating fluid and (b) a ground carbonaceous material, wherein the jet mill is pressurized by the circulating fluid;
 forwarding the second stream to a cyclone separator, wherein the cyclone separator is configured to separate a first portion of the ground carbonaceous material from a second portion of the ground carbonaceous material, wherein the first portion of the ground carbonaceous material includes particles having a particle size equal to or greater than a threshold particle size, and the second portion of the ground carbonaceous material includes particles having a particle size less than the threshold particle size;
 collecting the first portion of the ground carbonaceous material in a first collector;
 forwarding to a second collector a third stream comprising (1) the circulating fluid and (2) the second portion of the ground carbonaceous material, wherein the second collector is configured to separate the second portion of the ground carbonaceous material from the third stream to produce a fourth stream comprising the circulating fluid; and
 contacting the fourth stream with additional particles of the carbonaceous material to produce a fifth stream;
 wherein the first portion of the ground carbonaceous material comprises the solid carbonaceous material.

11. The method of claim 1, wherein the product is a fluid product, the fluid product comprising a product gas, a product condensate, a product liquid, or a combination thereof.

12. The method of claim 1, wherein (i) the solid carbonaceous material comprises coal, (ii) the hydrogen donor comprises tetralin, or (iii) the solid carbonaceous material comprises coal and the hydrogen donor comprises tetralin.

13. The method of claim 1, wherein the solid carbonaceous material is a component of a slurry or a paste.

14. A method of liquefaction, the method comprising:
 providing a hydrogen donor; and
 contacting a solid carbonaceous material and the hydrogen donor to convert at least a portion of the solid carbonaceous material to a product;
 wherein the providing of the hydrogen donor comprises (a) irradiating a susceptor material with electromagnetic energy to provide a heated susceptor material, and (b) contacting the hydrogen donor and the heated susceptor material to heat the hydrogen donor to a temperature of at least 300° C.;
 wherein the susceptor material and the heated susceptor material do not contact the solid carbonaceous material, and the susceptor material and the heated susceptor material do not contact the product; and
 wherein the contacting of the solid carbonaceous material and the hydrogen donor occurs at a pressure greater than the critical pressure of the hydrogen donor.

* * * * *